(12) United States Patent
Honeyball

(10) Patent No.: US 10,208,884 B2
(45) Date of Patent: Feb. 19, 2019

(54) WATERSHED PROTECTION DEVICE AND SYSTEM

(71) Applicants: Draingarde, Inc., Collingwood (CA); Jason Stephen Honeyball, Collingwood (CA)

(72) Inventor: Jason Stephen Honeyball, Collingwood (CA)

(73) Assignee: DRAINGARDE, INC., Collingwood, Ontario (CA)

( * ) Notice: Subject to any disclaimer, the term of this patent is extended or adjusted under 35 U.S.C. 154(b) by 0 days.

(21) Appl. No.: 15/115,442

(22) PCT Filed: Jan. 30, 2015

(86) PCT No.: PCT/CA2015/000051
§ 371 (c)(1),
(2) Date: Jul. 29, 2016

(87) PCT Pub. No.: WO2015/113142
PCT Pub. Date: Aug. 6, 2015

(65) Prior Publication Data
US 2017/0130889 A1    May 11, 2017

Related U.S. Application Data

(60) Provisional application No. 61/933,769, filed on Jan. 30, 2014.

(51) Int. Cl.
*F16L 55/10* (2006.01)
*F16L 55/115* (2006.01)
(Continued)

(52) U.S. Cl.
CPC .......... *F16L 55/115* (2013.01); *E01C 13/083* (2013.01); *E03F 5/0404* (2013.01)

(58) Field of Classification Search
CPC ...... E01C 13/083; E03F 5/0404; F16L 55/115
(Continued)

(56) References Cited

U.S. PATENT DOCUMENTS 535,929 A * 3/1895 Stuart ..................... F24F 13/02
138/89
1,531,113 A * 3/1925 Lovejoy .............. E02D 29/1427
49/465
(Continued)

FOREIGN PATENT DOCUMENTS

CA           155739      7/2015
WO      WO91/16505 A1   10/1991

OTHER PUBLICATIONS

Ductile Iron Manhole Cover, image post date Oct. 15, 2015, site visited Mar. 12, 2017, (online), <https://www.tineye.com/search/0foc188e18b98c0c2b02738210846db5ad42af42/>.
(Continued)

*Primary Examiner* — James Hook
(74) *Attorney, Agent, or Firm* — Daniel F. Nesbitt; Hasse & Nesbitt LLC

(57) ABSTRACT

The invention relates to a device for use in protecting watersheds from turf treatment contaminants particularly in relation to sports fields and golf courses. The invention further relates to methods and systems for the use of a plurality of the devices in a system to control, impede, or reduce the level of contaminants from turf treatments which enter drainage systems and catch basins associated with turf surfaces, turf sports fields, parks and golf courses. The invention relates to the device alone or in combination with a catch basin cover or in combination with a catch basin directly or in combination with a drainage riser.

20 Claims, 22 Drawing Sheets

(51) Int. Cl.
*E01C 13/08* (2006.01)
*E03F 5/04* (2006.01)

(58) Field of Classification Search
USPC .................................................. 138/89, 96 R
See application file for complete search history.

(56) References Cited

U.S. PATENT DOCUMENTS

| | | | |
|---|---|---|---|
| 2,153,790 A * | 4/1939 | Carswell | E02B 11/005 |
| | | | 138/159 |
| 2,395,619 A | 2/1946 | Fischer | |
| 2,576,353 A * | 11/1951 | Nelson | E03F 5/02 |
| | | | 138/89 |
| 2,820,407 A | 1/1958 | Smith | |
| 3,068,879 A | 12/1962 | Snowman | |
| 3,127,821 A | 4/1964 | Lebaron, Jr. | |
| 3,215,118 A | 11/1965 | Behlen | |
| 3,509,800 A * | 5/1970 | Kirkamp | E01C 9/008 |
| | | | 404/35 |
| 3,516,541 A | 6/1970 | Hardingham | |
| 4,184,188 A | 1/1980 | Briglia | |
| 4,384,918 A | 5/1983 | Abe | |
| 4,454,039 A | 6/1984 | McCoy | |
| 4,645,218 A | 2/1987 | Ooshio | |
| 4,682,907 A | 7/1987 | Gaudin | |
| D299,211 S | 1/1989 | Ahlgren | |
| 4,824,287 A | 4/1989 | Tracy | |
| D306,482 S * | 3/1990 | Milo | D25/36 |
| 4,919,564 A * | 4/1990 | Neathery | E02D 29/14 |
| | | | 277/648 |
| D312,125 S | 11/1990 | Epner | |
| 4,976,568 A * | 12/1990 | Hess | E02D 29/1409 |
| | | | 404/25 |
| 4,998,642 A * | 3/1991 | Kraus | B62D 25/24 |
| | | | 220/782 |
| 5,001,594 A | 3/1991 | Bobbio | |
| 5,015,371 A | 5/1991 | Webb | |
| D344,788 S | 3/1994 | Castro | |
| D351,704 S | 10/1994 | Breen | |
| 5,366,785 A | 11/1994 | Sawdai | |
| 5,383,765 A | 1/1995 | Baxter | |
| D369,420 S | 4/1996 | Haglund | |
| 5,522,131 A | 6/1996 | Steger | |
| 5,536,110 A * | 7/1996 | Tompkins | E01C 9/00 |
| | | | 404/25 |
| D372,969 S | 8/1996 | Hicks | |
| D373,417 S | 9/1996 | Lee | |
| D374,074 S | 9/1996 | Chen | |
| D376,198 S | 12/1996 | Jaspers-Fayer | |
| D377,213 S | 1/1997 | Wang | |
| D379,221 S | 5/1997 | Jaspers-Fayer | |
| D381,161 S | 7/1997 | Berend et al. | |
| D381,612 S | 7/1997 | Ma | |
| 5,733,445 A | 3/1998 | Fanelli | |
| D398,997 S | 9/1998 | Taylor | |
| 5,822,920 A * | 10/1998 | Tsay | A01G 31/06 |
| | | | 47/60 |
| 5,823,711 A | 10/1998 | Herd et al. | |
| D414,257 S | 9/1999 | Estrada | |
| 5,954,952 A | 9/1999 | Strawser, Sr. | |
| 5,956,905 A | 9/1999 | Wiedrich | |
| 5,988,580 A | 11/1999 | Bucher | |
| D420,122 S | 2/2000 | Moroi | |
| 6,037,574 A | 3/2000 | Lanham | |
| D425,613 S | 5/2000 | Good | |
| D434,487 S | 11/2000 | Moroi | |
| 6,161,984 A | 12/2000 | Sinclair | |
| 6,197,121 B1 | 3/2001 | Gurary | |
| 6,215,642 B1 | 4/2001 | Sogard | |
| D445,687 S | 7/2001 | Gilbertson | |
| 6,278,600 B1 | 8/2001 | Shamouilian | |
| 6,435,764 B1 | 8/2002 | McNeely | |
| D490,183 S | 5/2004 | Benensohn | |
| D493,246 S | 7/2004 | Benensohn | |
| 6,839,217 B1 | 1/2005 | Larsen | |
| D507,337 S | 7/2005 | Chan | |
| D508,286 S | 8/2005 | Castellanos | |
| 6,979,148 B2 | 12/2005 | Happel et al. | |
| 7,032,834 B1 | 4/2006 | Anderson | |
| 7,041,159 B2 | 5/2006 | Entezarian | |
| D534,269 S | 12/2006 | Liang | |
| 7,144,189 B1 | 12/2006 | Bongiovanni | |
| D534,488 S | 1/2007 | Rosene | |
| D536,774 S | 2/2007 | Kuo | |
| D540,461 S | 4/2007 | Folkers | |
| D541,405 S | 4/2007 | Snyder | |
| D555,777 S | 11/2007 | Aveldson | |
| D557,792 S | 12/2007 | Cox | |
| D558,325 S | 12/2007 | Karnes | |
| D574,077 S | 7/2008 | Horng | |
| D579,719 S | 11/2008 | King | |
| D581,511 S | 11/2008 | Rosten | |
| D587,797 S | 3/2009 | Blanchard | |
| D588,078 S | 3/2009 | Okada | |
| D588,139 S | 3/2009 | Fujino | |
| D588,256 S | 3/2009 | Daniels | |
| D589,134 S | 3/2009 | O'Hagin | |
| D589,471 S | 3/2009 | Komatsu | |
| D589,472 S | 3/2009 | Li | |
| D591,843 S | 5/2009 | Van Becelaere | |
| D601,521 S | 10/2009 | Komatsu | |
| D610,245 S | 2/2010 | Daniels | |
| D610,405 S | 2/2010 | McConnell | |
| 7,658,183 B1 | 2/2010 | Johnson | |
| D616,389 S | 5/2010 | Takahashi | |
| D625,461 S | 10/2010 | Yao | |
| D632,246 S | 2/2011 | Park | |
| 7,950,075 B2 | 5/2011 | Evans, Jr. et al. | |
| D649,126 S | 11/2011 | Takahashi | |
| 8,051,568 B2 | 11/2011 | Moody et al. | |
| D650,344 S | 12/2011 | Takahashi | |
| 8,104,203 B2 | 1/2012 | Mackler | |
| 8,117,686 B2 | 2/2012 | Powell et al. | |
| D657,858 S | 4/2012 | Platt | |
| D660,225 S | 5/2012 | Heidtmann | |
| D661,645 S | 6/2012 | Heidtmann | |
| 8,230,530 B2 | 7/2012 | Evans, Jr. et al. | |
| D667,099 S | 9/2012 | Williams | |
| D668,212 S | 10/2012 | Barron | |
| D669,685 S | 10/2012 | Legreca | |
| D670,372 S | 11/2012 | Inagawa | |
| D671,633 S | 11/2012 | Glasbrenner | |
| D674,919 S | 1/2013 | Higgins | |
| D674,964 S | 1/2013 | Bailey | |
| D677,369 S | 3/2013 | Tindall | |
| D677,370 S | 3/2013 | Handley | |
| D677,818 S | 3/2013 | Steele | |
| D679,444 S | 4/2013 | Vasylyev | |
| 8,651,924 B1 | 2/2014 | Jones | |
| D702,998 S | 4/2014 | Fugere | |
| 8,696,300 B1 | 4/2014 | Burke, Jr. | |
| D714,718 S | 10/2014 | Loeckenhoff | |
| D715,950 S | 10/2014 | Vanderheyden | |
| D716,522 S | 11/2014 | King | |
| D716,523 S | 11/2014 | King | |
| 8,877,048 B1 | 11/2014 | Owings | |
| D720,313 S | 12/2014 | Flynn | |
| D721,326 S | 1/2015 | Brown | |
| D722,821 S | 2/2015 | Liu | |
| D738,537 S | 9/2015 | Lillejord | |
| 9,147,785 B2 | 9/2015 | Haddock | |
| D763,418 S | 8/2016 | Towiwat | |
| D768,843 S | 10/2016 | Honeyball | |
| 2004/0007512 A1 | 1/2004 | Petersen | |
| 2004/0128903 A1 | 7/2004 | Wexler | |
| 2005/0220637 A1 | 10/2005 | Kopel | |
| 2007/0034583 A1 | 2/2007 | Henning | |
| 2007/0166146 A1 | 7/2007 | Sekiya | |
| 2008/0257581 A1 | 10/2008 | Masago | |
| 2011/0056154 A1 | 3/2011 | Van Der Velden | |
| 2011/0186567 A1 | 8/2011 | Carll | |
| 2012/0131980 A1 | 5/2012 | Yamamoto | |
| 2013/0118963 A1 | 5/2013 | Bailey | |

(56) References Cited

U.S. PATENT DOCUMENTS

| | | |
|---|---|---|
| 2013/0129418 A1 | 5/2013 | Wander |
| 2013/0153079 A1* | 6/2013 | Zeyfang ............... F16L 57/005 |
| | | 138/96 R |
| 2014/0077431 A1 | 3/2014 | Weaver |
| 2014/0255098 A1 | 9/2014 | Beaudoin |
| 2015/0155416 A1 | 6/2015 | Matsune |
| 2015/0354597 A1 | 12/2015 | I |
| 2016/0025262 A1 | 1/2016 | Stearns |
| 2016/0065125 A1 | 3/2016 | Kondo |
| 2016/0105143 A1 | 4/2016 | Johansen |
| 2016/0195579 A1 | 7/2016 | Simmons |
| 2016/0273670 A1 | 9/2016 | Karppa |
| 2017/0002205 A1 | 1/2017 | Murai |
| 2017/0045059 A1 | 2/2017 | Care |

OTHER PUBLICATIONS

AGA cast iron round grill pan, image post date Jan. 12, 2012, site visited May 8, 2016, (online), <https://www.youtube.com/watch?v=x1W5ZjiTyRQ>.

George Forman 360 Removable Grill, image post date Jan. 1, 2011, site visited May 8, 2016, (online), <https://www.tineye.com/search/510ef2dca9198f4ee3f5dcbcd5ff014a55488fe4/>.

Round Grate Styles, image post date Mar. 25, 2013, site visited May 8, 2016, (online), <http://web/archive.org/web/20130325024232/http://www.usfoundry.com/usfoundry/catch-basin-grate-styles/>.

\* cited by examiner

WATERSHED PROTECTION DEVICE AND SYSTEM

CROSS-REFERENCE TO RELATED APPLICATIONS

This application is a US National Stage of International Application No. PCT/CA2015/000051, filed Jan. 30, 2015, which claims benefit of U.S. Provisional Application Ser. No. 61/933,769, filed Jan. 30, 2014, the disclosures of which are incorporated herein by reference.

FIELD

The field of the invention relates to a device for use in protecting watersheds from contaminants and particularly for use on turf surfaces, sports fields and golf courses and it further relates to the use of a plurality of the devices in a system to control, impede, or reduce the level of contaminants from turf treatments which enter drainage systems and catch basins associated with turf surfaces, turf sports fields, parks and golf courses. The invention yet further relates to the device alone or in combination with a catch basin cover or in combination with a catch basin directly or in combination with a drainage riser. The field of the present invention is not limited to golf courses or sports fields. The field of the invention relates broadly to turfgrass management including, without limitation, turfgrass management on golf courses, sports fields and related turf surfaces, parks, and other recreational activities for which turf is maintained and managed.

BACKGROUND

A watershed is the land area from which water drains to a particular body of water. Watershed planning and management is increasingly important around the world as a way to protect water sources from contaminants. Turfgrass management is related to watershed management as turfgrass surfaces drain naturally or by man-made systems into watersheds. Turfgrass management systems typically comprise drains or drainage systems into which water, including excess water, drains. The drains or drainage systems often empty into the surrounding watershed and/or aquifers. As such, turfgrass management is connected with watershed management.

The principles and uses of the device and system taught and claimed herein may be equally applied to a variety of turf surfaces which comprise drains or drainage systems. Golf courses comprise large areas of turf which are drained and maintained. Golf courses and turf managers are continually seeking to improve the ecological footprint of the course by reducing contamination of the watershed where the golf course is situated and reducing the amount of water used to maintain the course.

As part of turf management for a golf course, treatments comprising inputs, including synthetic inputs both fluids and particulates, are applied to the turf for management of the health, durability and growth of the turf. The application of such inputs, including pesticides, herbicides and fertilizers, to the turf is an integral part of the turf management of the course yet these same inputs, while beneficial to the turf, could be harmful if accumulating in the watershed. A goal in golf course and turf management is to keep more of the inputs (which are typically but not only synthetic inputs) on the turf and reduce the amount of the inputs entering nearby drains and water systems. Management of water is also an integral part of golf course management and management of the turfgrasses.

Turfgrass management is a field unto itself. Turfgrasses are used for a variety of public and private spaces and activities and are commonly used on golf courses and sports playing fields. Turfgrass institutes and research facilities have been established to study turfgrass science including a focus in areas such as the environmental aspects of fertilizer, pesticide and herbicide use (both fate and persistence) in both established sports fields and turf surfaces, such as golf courses, and in the new construction of new sports fields, turf surfaces and golf courses. New technologies such as the instant technology taught and claimed herein may be used on currently established fields, surfaces and courses and can be planned into the new constructions of these in the future taking into consideration the techniques, systems and use of devices as described and claimed herein.

There is an increasing need to operate and maintain turf courses and surfaces in an ecologically friendly and environmentally sustainable manner. Water is an increasingly valued resource and golf courses continue to search for viable ways to reduce water usage on golf courses and provide good stewardship in reducing contaminants in the watershed. Good course stewardship requires continuing efforts towards ensuring synthetic contaminants/inputs are reduced or minimized in the water systems (drainage infrastructure of the course) and thereby minimized or reduced in an associated watershed.

A lack of water continues to be a serious concern for all countries and this is also true for golf courses and other turf playing surfaces particularly in regions which can experience drought. Accordingly it is even more essential in these regions that the water which is available is kept as clean as possible.

In addition, climate change is affecting weather patterns worldwide and even areas which may not have regularly experienced drought may at times be faced suddenly with rainfall shortages. Restrictions on water use, by local and regional governments, are typically put in force during times of drought and rainfall shortages. In turn, water usage restrictions, directly impact on golf course water management is a continually advancing concern. Controlling the movement of the inputs inherent in turf treatments into water systems is an important aspect of maintaining both the activity such as the golf course or sports field in top form while at the same time maintaining cleaner water in the surrounds thereby improving the ecological footprint of the course.

Reduction of synthetic residues caused by the inputs used in turf treatments then entering turf drainage systems is an important ongoing issue for golf courses and other similar high maintenance playing turf surfaces. Golf courses and other turf playing surfaces collect surface water which must be drained and drainage systems on the course or surface must be present on the course or surface for optimal maintenance. Controlling access of inputs used in the turf treatments, into the draining systems, must be considered as the water present in course drainage systems eventually will, if not contained, move into the surrounding watershed including aquifers. Fertilizers, herbicides and pesticides are examples of inputs required for the maintenance of the golf course and/or turf surface; however, these synthetic inputs are not all absorbed by the turf itself and excess amounts will eventually enter the water of the extant drainage systems on the golf course or turf surface. Reductions in contamination of water systems by these synthetic inputs may even be required by legislation and therefore there is an ongoing need to consider means for reducing access of inputs into the water systems, drainage systems, and eventually the watersheds, as increasingly important and an integral part of turf management and turf stewardship.

As part of the stewardship of the golf course the maintenance and care of the turf should also include the water systems associated with turf maintenance. The use of recycled water on golf courses is becoming more prevalent in response to water usage restrictions. Irrigation is considered one of the best uses for recycled water because turfgrasses naturally filter the water before it returns to the drainage system and/or surrounding aquifer (Carson, T. "Recycled and, Possibly, Required" Golf Course Management, "GCM", June 2013, at page 38). Accordingly reductions in access of treatment inputs into water which will be recycled is also important to reduce the accumulation of synthetic residues in the water.

In order to play golf or another sport which uses turfgrass as its playing surface, it is necessary to remove water from the course or surface before play on the surface commences. The use of "on-course" drainage systems and ponds to collect run-off water from turfgrass watering and rain continues to develop in the golf course industry. In particular the run-off is collected and stored for later irrigation of the turf where possible; however, few systems are entirely self contained and most eventually lead to the surrounding watershed and/or aquifers off site.

As described by Steve Trusty in the June 2013 issue of GCM, at page 36, water may be diverted into the watershed off the golf course or turf playing surface. Additional water drainage creeks, ponds, wet meadows and the like may be used to interconnect with existing ponds although a closed loop system is a luxury. As water moves through the course watershed, additional filtering can be managed. In this context the present device and system is advantageous in impeding, reducing and controlling access of inputs at the time the inputs are applied to the golf course or turf surface.

Attention must be paid to managing what chemicals are placed on the turf and impeding transfer of these chemicals to the watershed, aquifers, and water systems present on golf courses. The devices and systems described herein reduce contamination of local water systems and aquifers and surrounding bodies of water cause by exposure of the turf to inputs such as fertilizers, herbicides and pesticides.

To maintain healthy turfgrasses applications of chemical and other treatments are required. At the same time the management of water on and around turf courses and playing surfaces is essential for the proper use of the facility. Accordingly drainage systems are used to collect water and to move water off the playing surface. The majority of turf courses worldwide have catch basins, of various kinds, to collect surface water that runs off. The drained surface water is collected and diverted. Excess water cannot stay on the turf playing surface and accordingly water maintenance is fundamental to turfgrass management and as a result the maintaining of the water quality is also required.

Turf drainage systems for golf courses and other turf playing surfaces are comprised of a plurality of catch basins which present directly to the water systems on and off the course or playing surface. Turf drainage openings are present on the course which, at best may be covered by a grate over the opening or the opening is uncovered. In order to ensure the flow of water the drainage openings allow free and unimpeded flow of water off the course into the drains and drainage system.

A grate has openings to allow free flow of water yet it also prevents large items from falling into the drainage system; however, particulates or liquids applied to the turf, over the drainage openings, will still drop into the drainage and water systems thereby contaminating the water systems of the course and possibly the aquifer and surrounding watershed and even other nearby bodies of water. These contaminants greatly contribute to environmental risk and liability.

Accordingly, there remains a need to further protect the water systems and surrounds from synthetic chemical inputs on a turfgrass or a turf playing surface. There remains a need to address the increased risk of contamination of water systems as drainage increases on turf courses and surfaces.

Reducing impacts of golf courses and turf playing surfaces on the surrounding environs is an ongoing goal for golf course superintendents and forms part of overall stewardship of the courses. The Environmental Institute for Golf (EIFG) is a philanthropic organization of the Golf Course Superintendents Association of America (GCSAA) which is dedicated to strengthening the compatibility of the sport of golf with the natural environment. The golf course industry continues to advance towards greater sustainability and a commitment to continual improvement. The Best Management Practices (BMP) include water quality protection in which fertilizers and pest control products must be applied in ways required to achieve water-quality protection goals.

SUMMARY

In accordance with an aspect of the present invention, there is provided a protective device and protective system and method of using the device for turf drainage systems.

In accordance with an aspect of the present invention the device and systems taught and claimed herein, impede or prevent water contamination caused by synthetic treatments, comprising chemicals to turf surfaces from entering into a drainage system or surrounding watershed. By impeding the contaminants at the time of application on the course or turf surface, less contaminants enter into the drainage system leading to improved sustainability of the water systems associated with and in the surrounding vicinity of turf grass systems, turf fields, golf courses, and other turf surfaces.

BRIEF DESCRIPTION OF THE FIGURES

Other and further advantages and features of the invention will be apparent to those skilled in the art from the following detailed description taken together with the accompanying Figures.

For the purpose of illustrating the invention, there is shown in the Figures exemplary embodiments. It is understood that the scope of the present invention is not limited to the precise arrangements, instrumentalities, or exact depictions shown. These Figures exemplify particular embodiments of the invention and other embodiments would be understood to persons skilled in the art to be operable within the scope of the invention as set forth in the specification as a whole.

In the accompanying Figures like reference numerals refer to the like parts throughout, in which:

FIG. 1 illustrates an exploded top perspective view of an embodiment of the present invention in the presence of a catch basin.

FIG. 2 illustrates a top perspective view of an embodiment of the present invention in combination with a catch basin.

FIG. 3 illustrates a partial sectional side view of an embodiment of the present invention in use.

FIG. 4 illustrates a complete cross-sectional side view of an embodiment of the present invention in use.

FIG. 5 illustrates a top perspective view of an embodiment of the present invention in use.

FIG. 6 illustrates a top perspective view of an embodiment of the present invention.

FIG. 7 illustrates a bottom perspective view of an embodiment of the present invention.

FIG. 8 illustrates a left side view of an embodiment of the present invention.

FIG. 9 illustrates a front side view of an embodiment of the present invention.

FIG. 10 illustrates a right side view of an embodiment of the present invention.

FIG. 11 illustrates a rear side view of an embodiment of the present invention.

Figure 12:
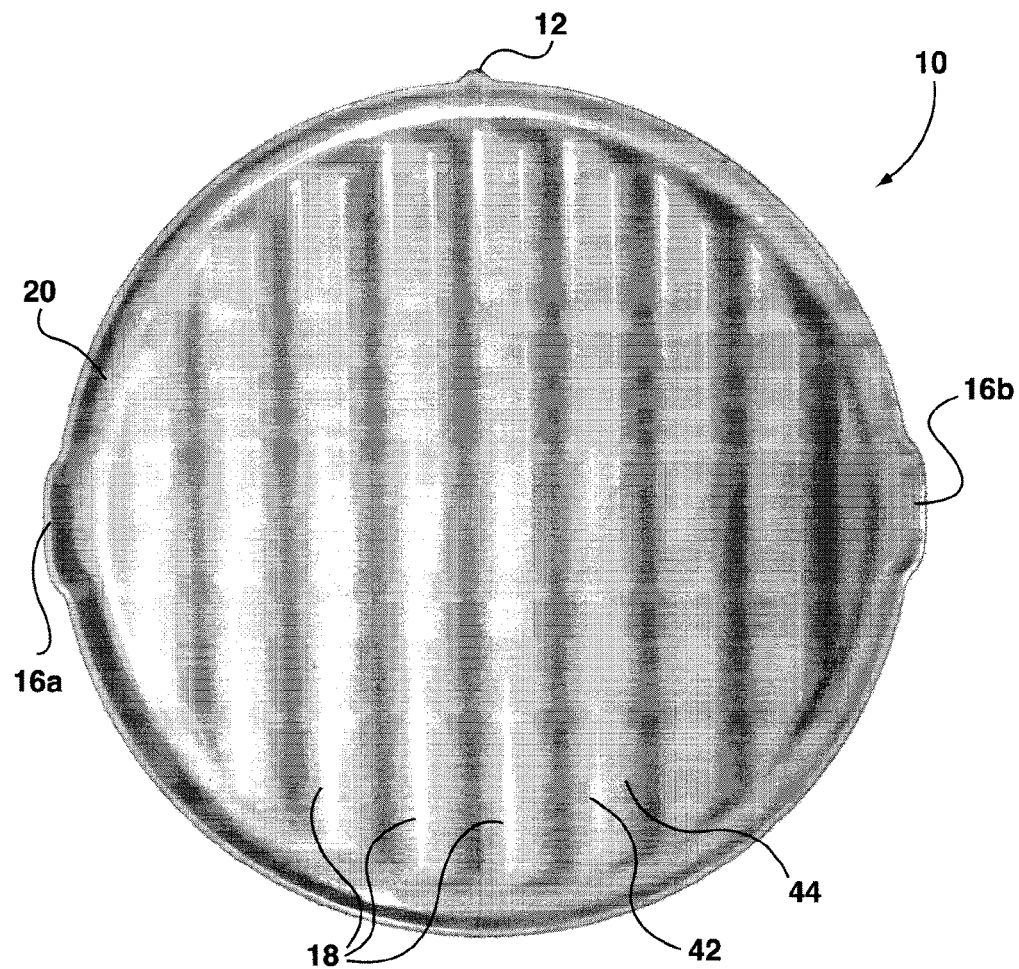

FIG. 12 illustrates a top plan view of an embodiment of the present invention.

Figure 13:
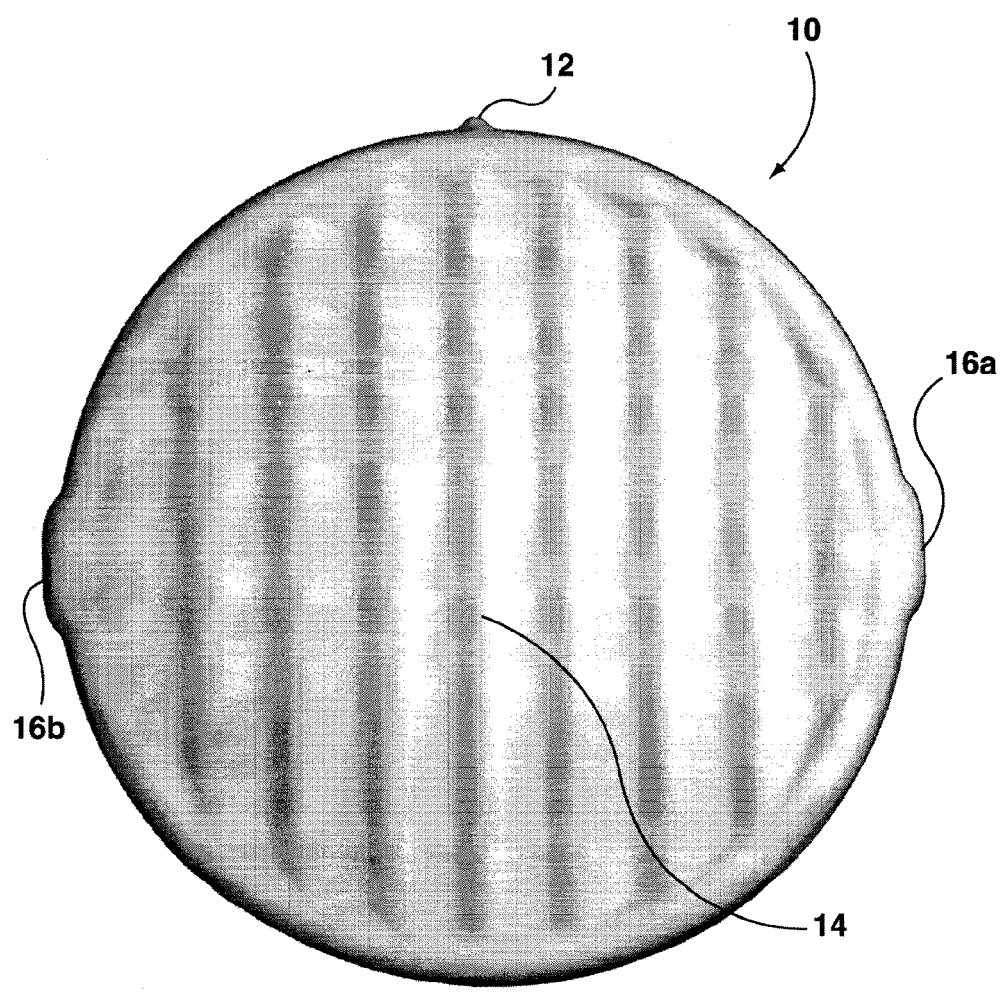

FIG. 13 illustrates a bottom view of an embodiment of the present invention.

Figure 14:
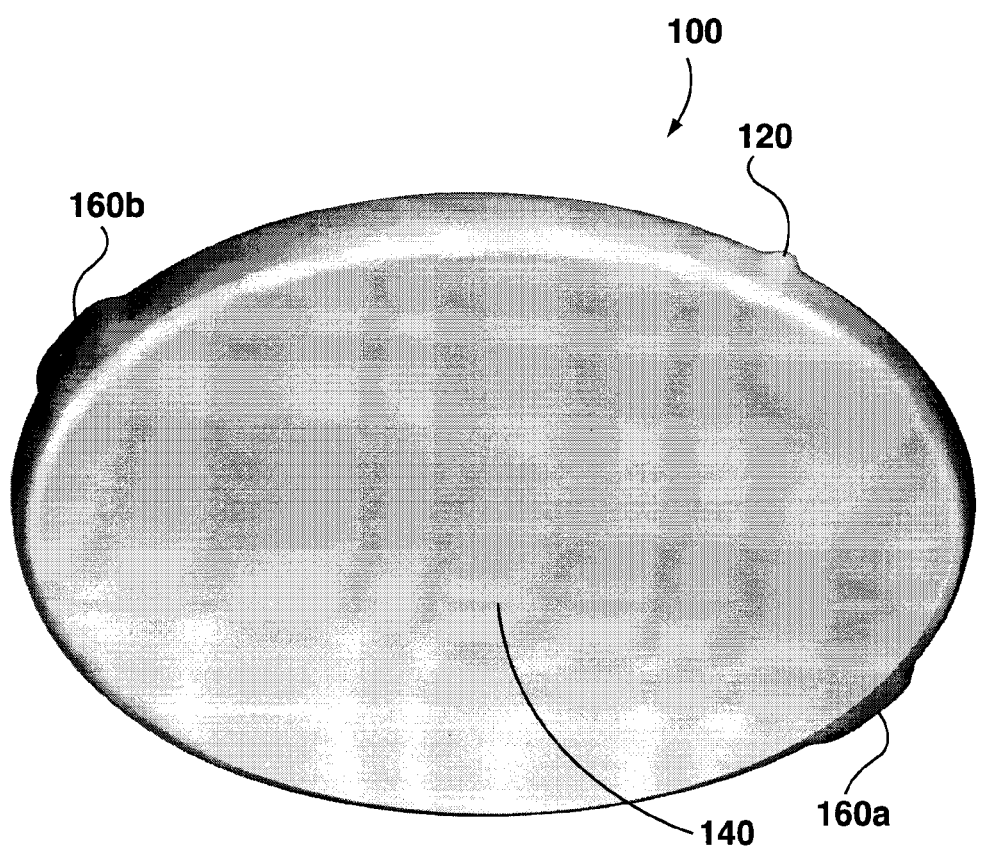

FIG. 14 illustrates a bottom rear perspective view of a second embodiment of the present invention illustrating a flat bottom. The top perspective view, left side view, front side view, right side view, rear side view, and top plan view of the second embodiment are the same as the corresponding views illustrated in FIGS. 6, 8, 9, 10, 11, and 12 respectively.

Figure 15:
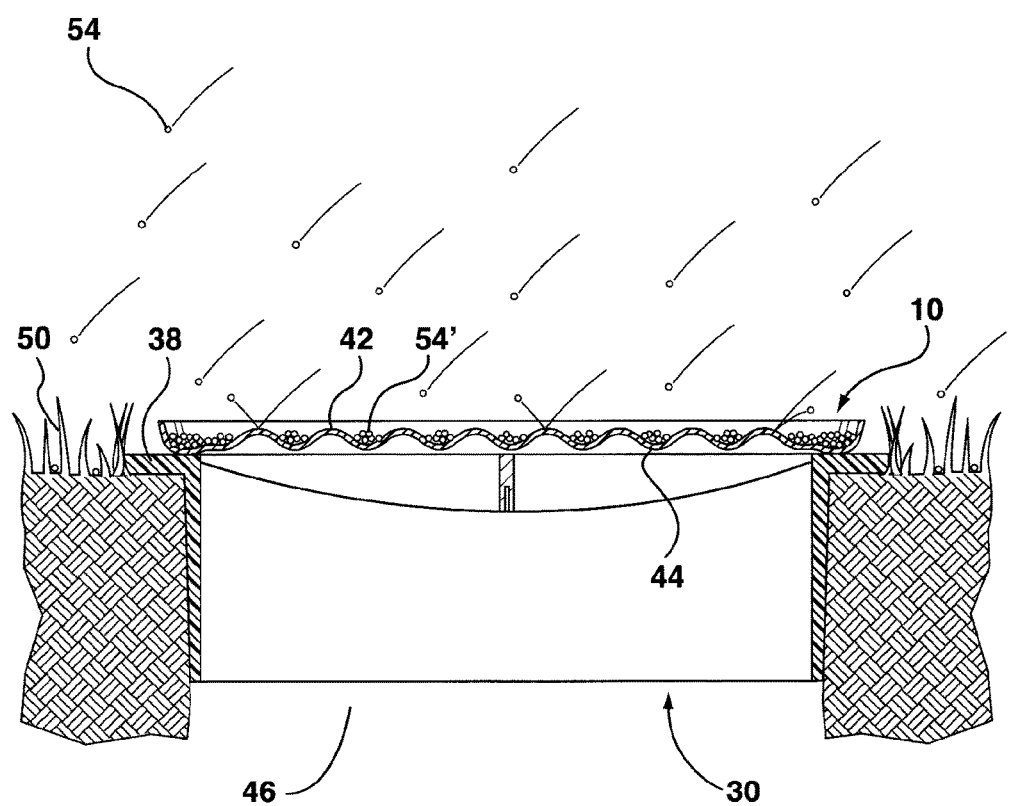

FIG. 15 illustrates a complete cross-sectional side view of an embodiment of the present invention with the application of particulates in the presence of the device.

Figure 16:
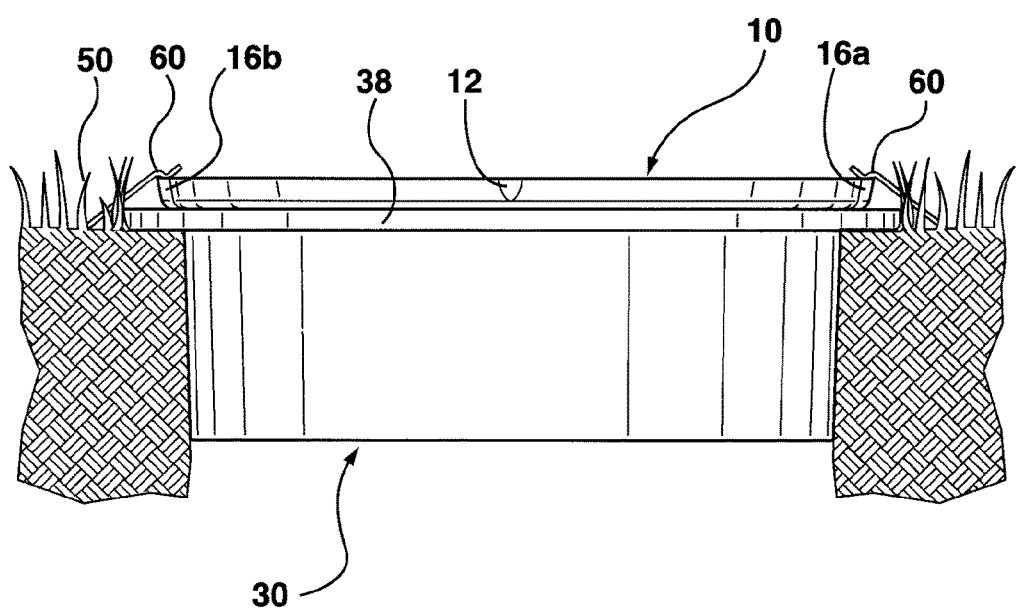

FIG. 16 illustrates a partial cross-sectional side view of an embodiment of the present invention illustrating the optional use of sod pins or staples in association with the device.

Figure 17:
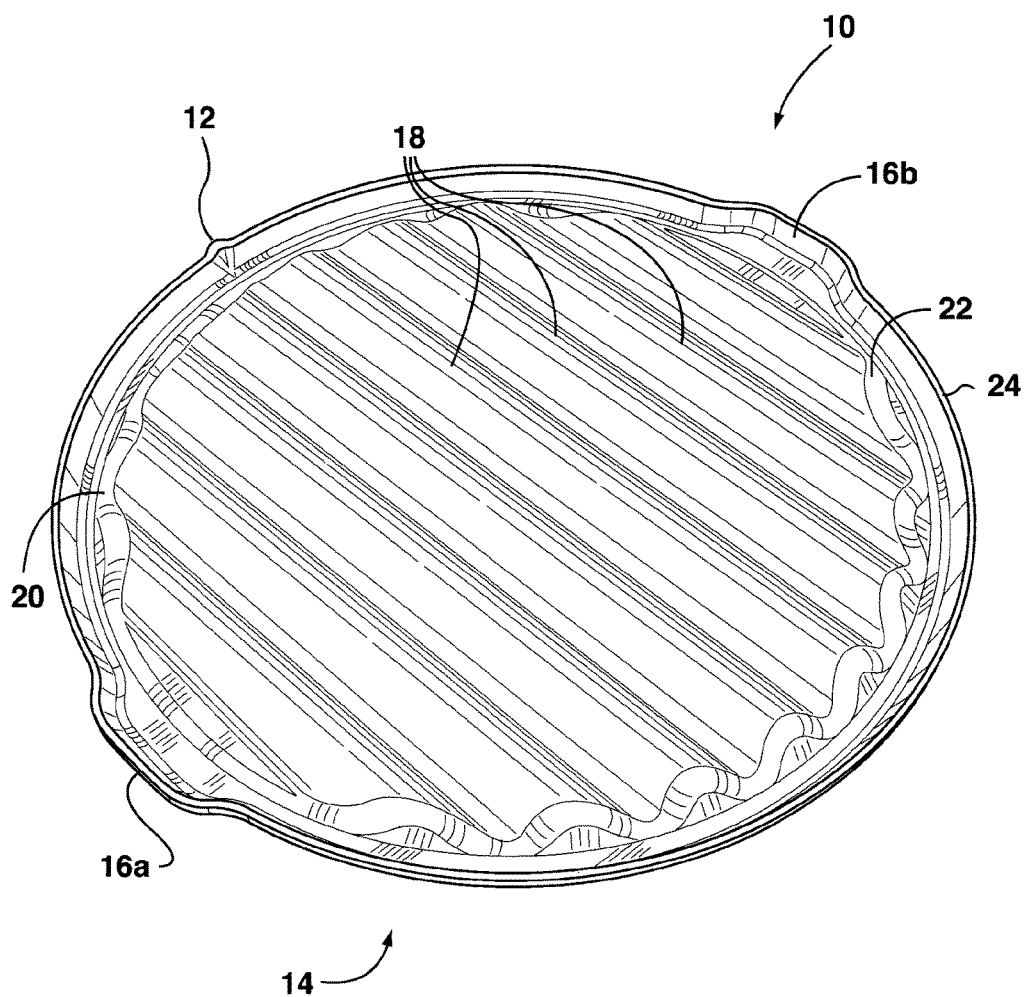

FIG. 17 illustrates a top perspective view of a third embodiment of the present invention.

Figure 18:
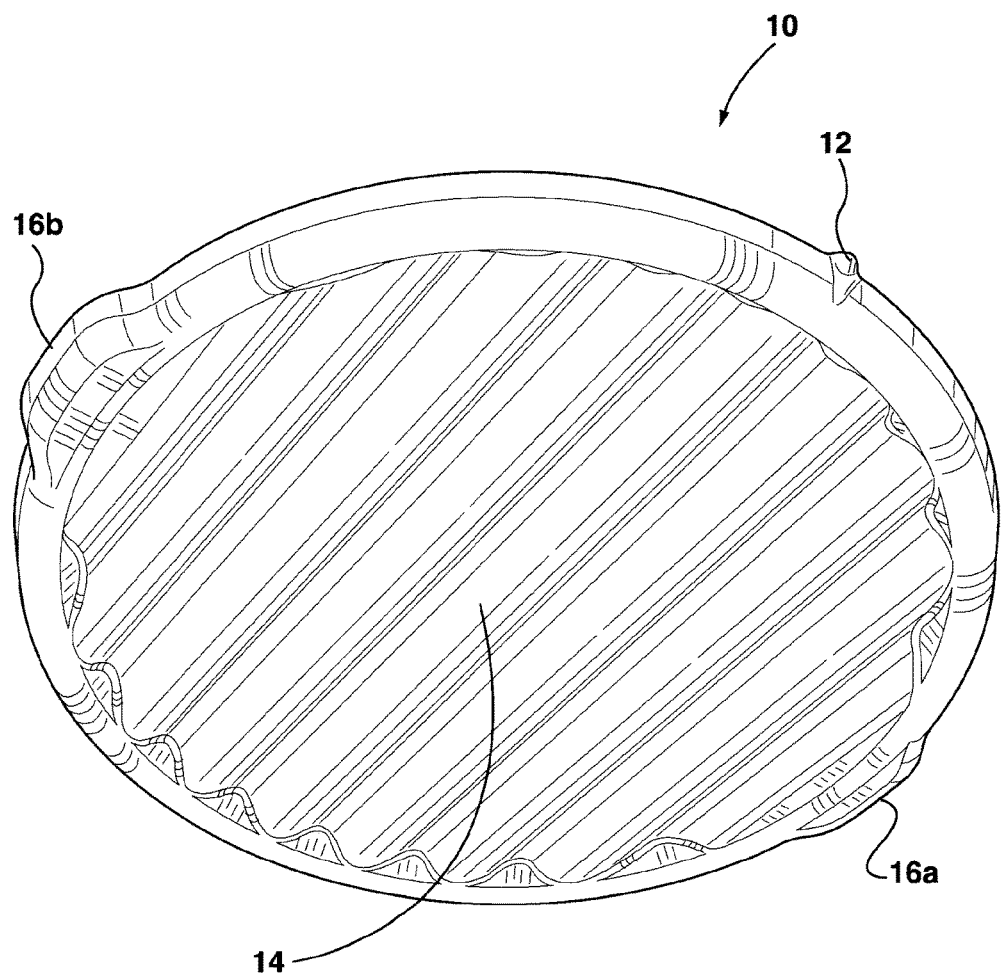

FIG. 18 illustrates a bottom perspective view of a third embodiment of the present invention.

Figure 19:
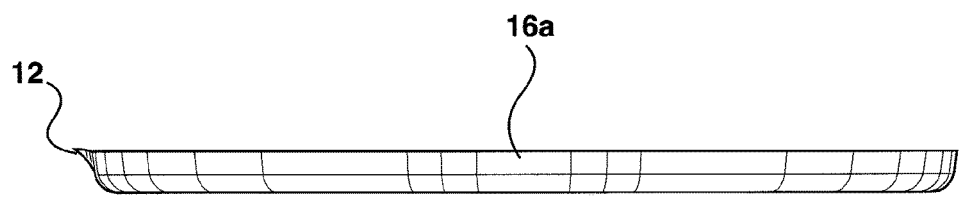

FIG. 19 illustrates a left side view of a third embodiment of the present invention.

Figure 20:
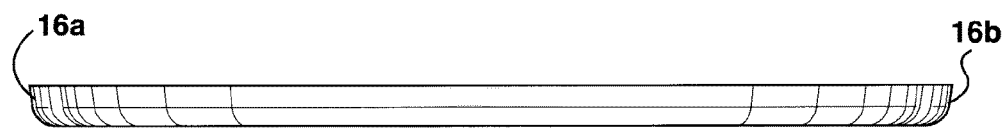

FIG. 20 illustrates a front side view of a third embodiment of the present invention.

Figure 21:
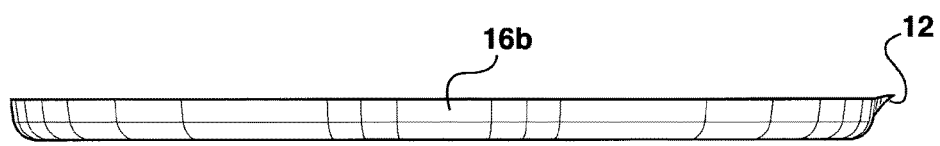

FIG. 21 illustrates a right side view of a third embodiment of the present invention.

Figure 22:
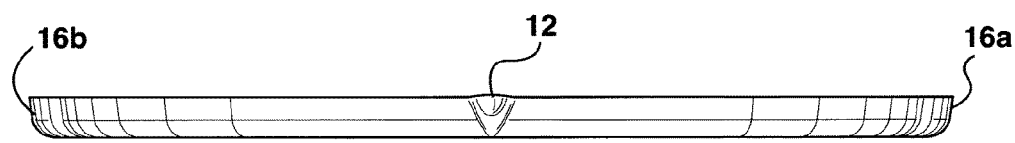

FIG. 22 illustrates a rear side view of a third embodiment of the present invention.

Figure 23:
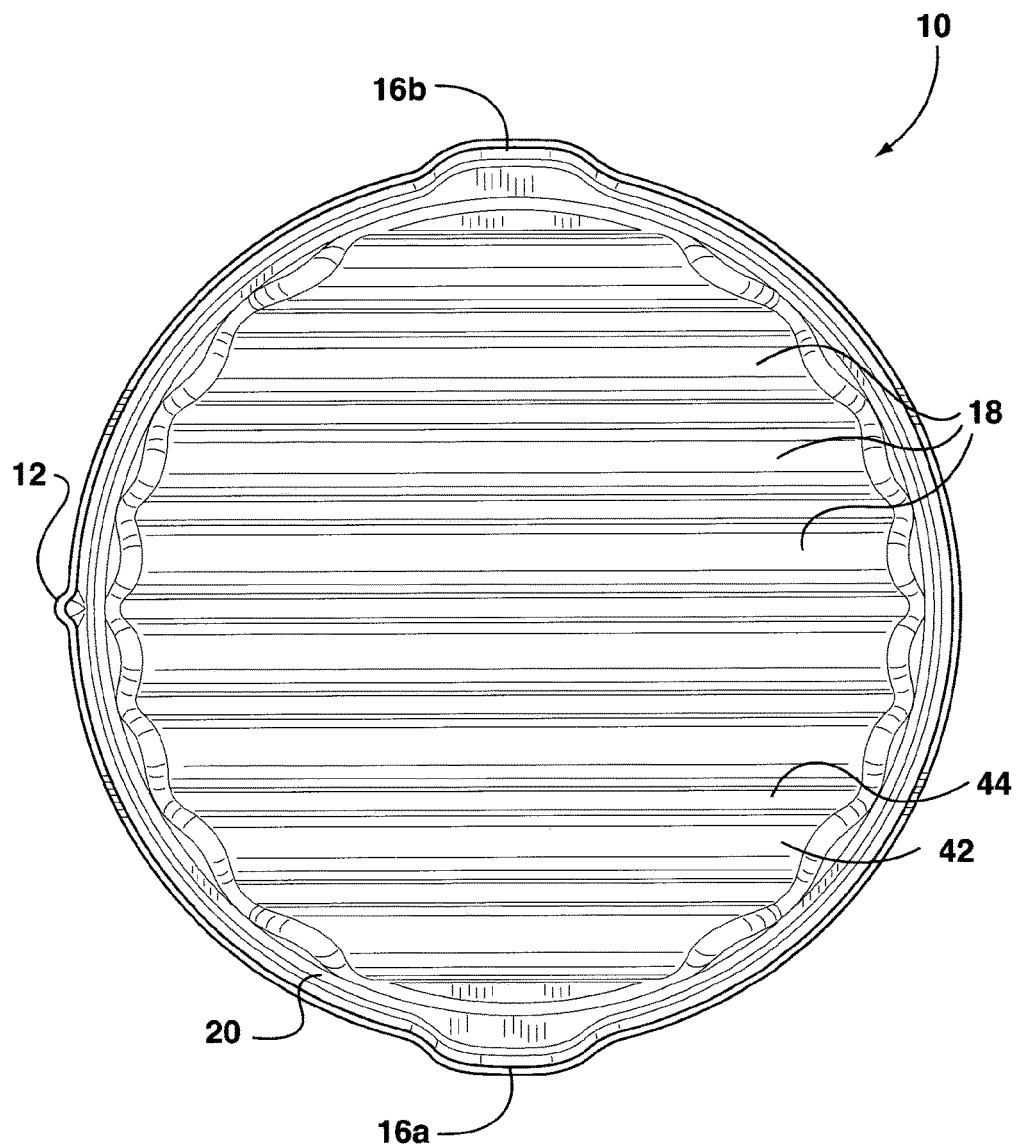

FIG. 23 illustrates a top plan view of a third embodiment of the present invention.

Figure 24:
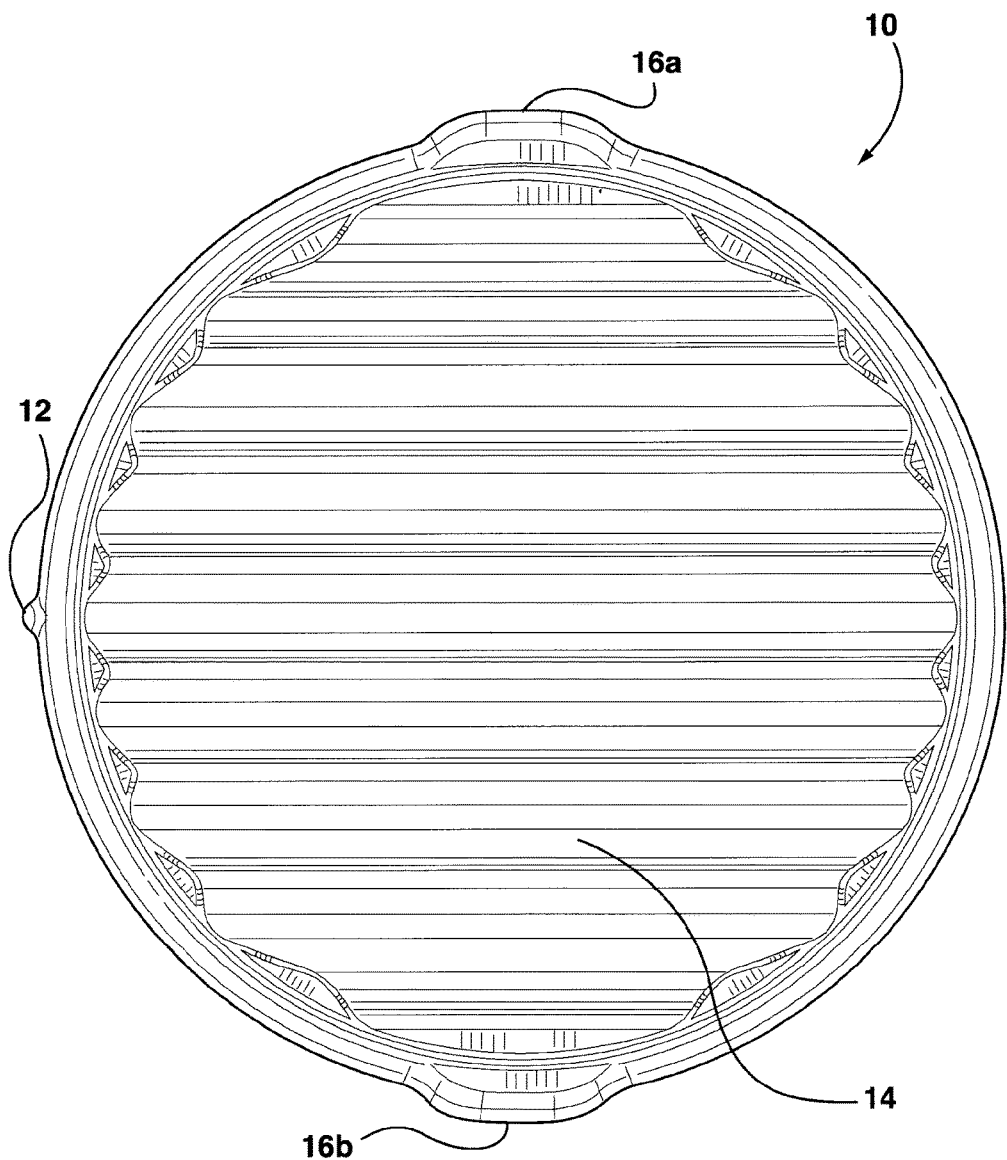

FIG. 24 illustrates a bottom view of a third embodiment of the present invention.

Figure 25:
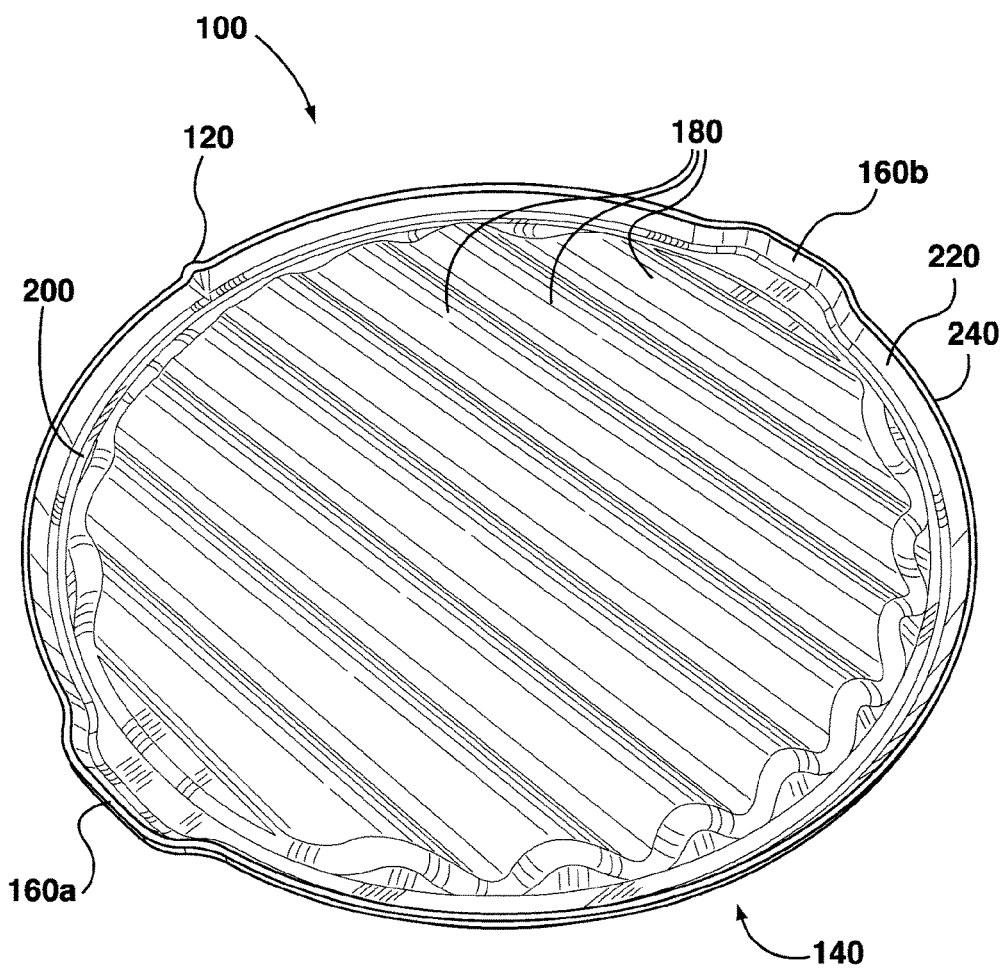

FIG. 25 illustrates a top perspective view of a fourth embodiment of the present invention illustrating a flat bottom and ridges on the top side.

Figure 26:
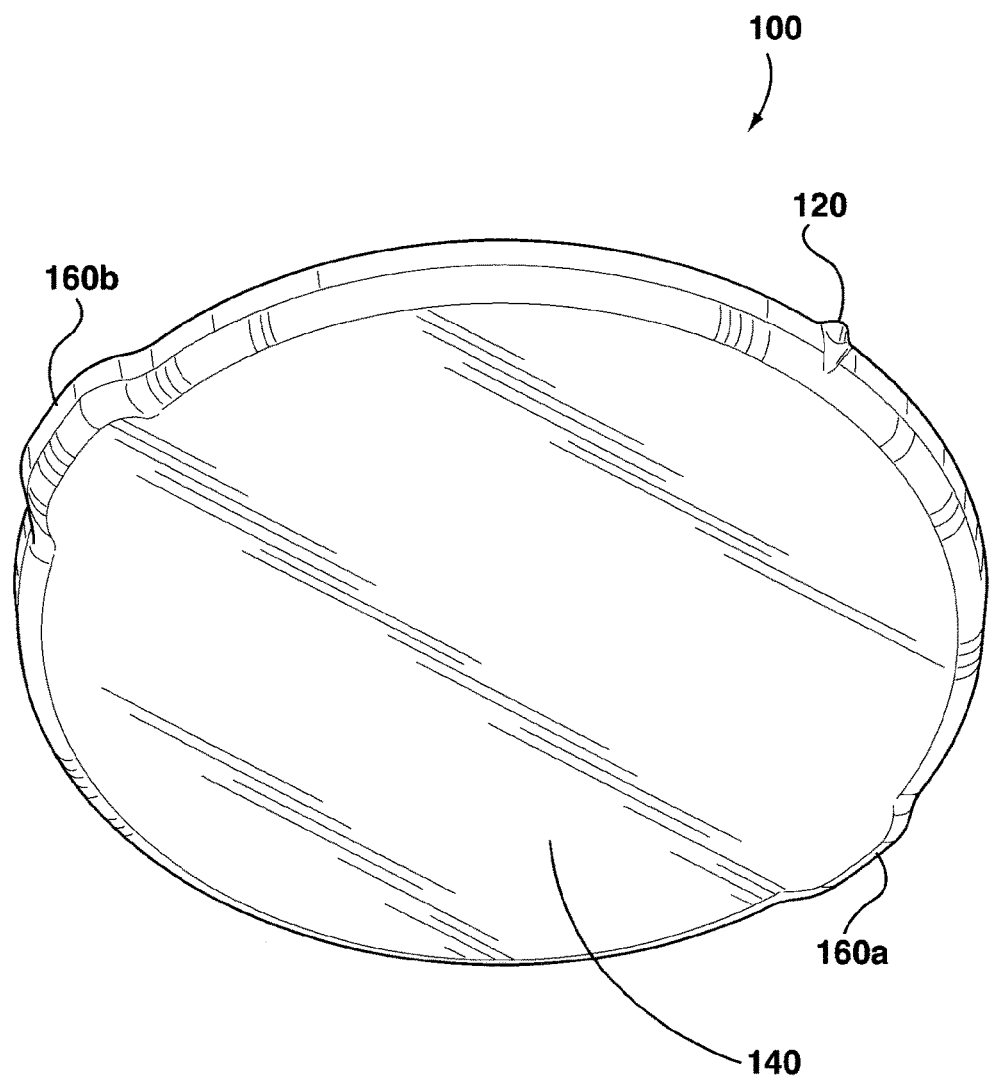

FIG. 26 illustrates a bottom perspective view of a fourth embodiment of the present invention illustrating a flat bottom.

Figure 27:
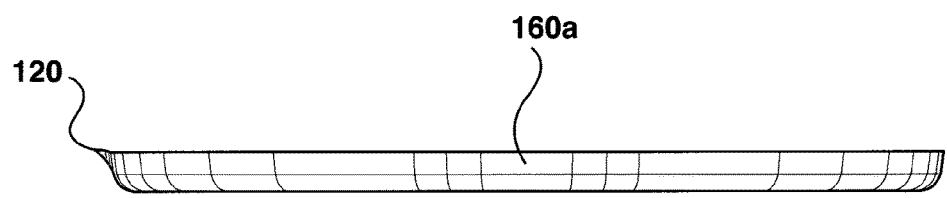

FIG. 27 illustrates a left side view of a fourth embodiment of the present invention illustrating a flat bottom.

Figure 28:
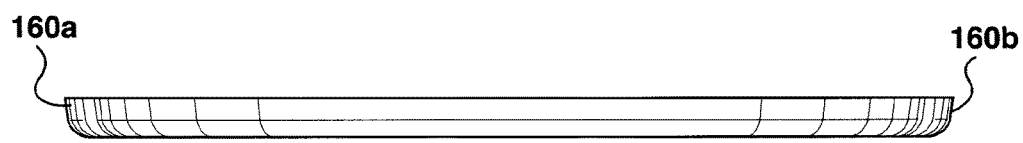

FIG. 28 illustrates a front side view of a fourth embodiment of the present invention illustrating a flat bottom.

Figure 29:
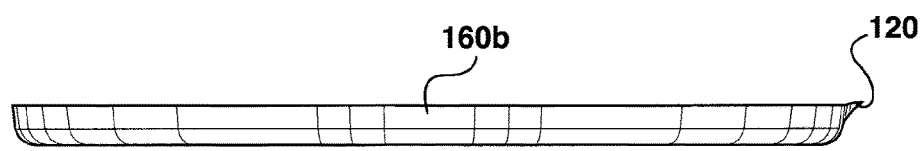

FIG. 29 illustrates a right side view of a fourth embodiment of the present invention illustrating a flat bottom.

Figure 30:
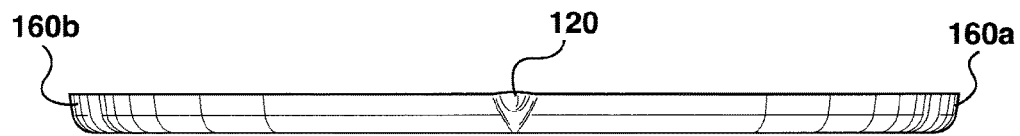

FIG. 30 illustrates a rear side view of a fourth embodiment of the present invention illustrating a flat bottom.

Figure 31:
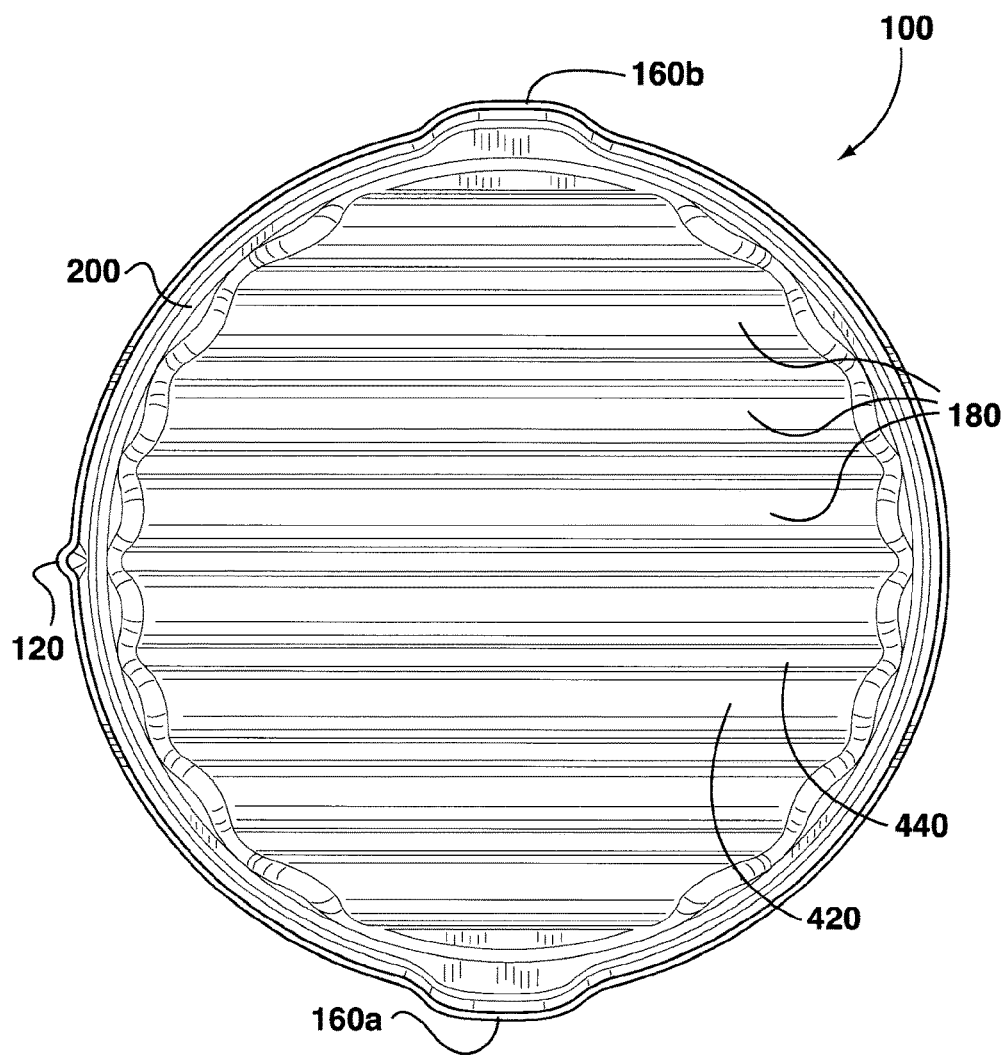

FIG. 31 illustrates a top plan view of a fourth embodiment of the present invention illustrating a flat bottom and ridges on the top side.

Figure 32:
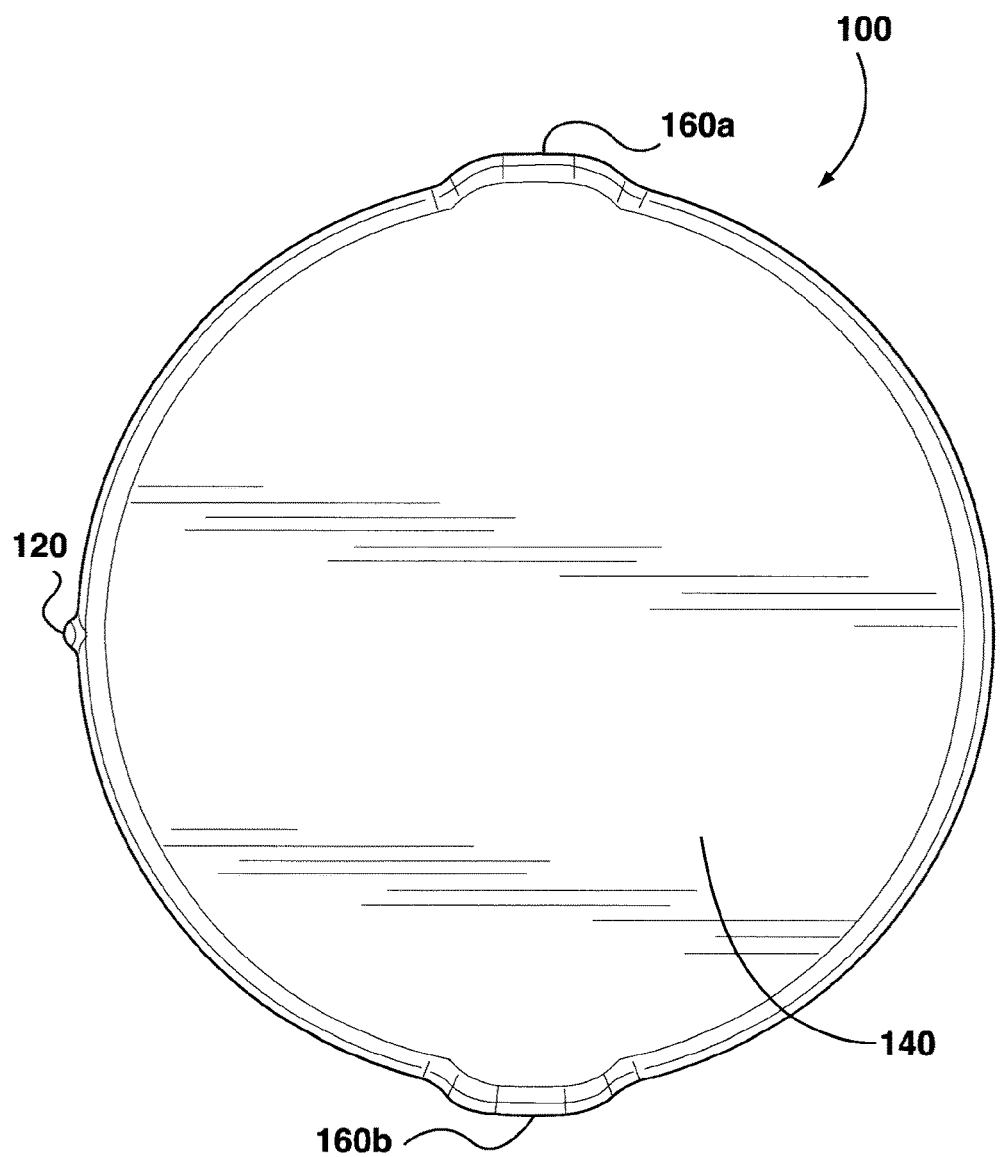

FIG. 32 illustrates a bottom view of a fourth embodiment of the present invention illustrating a flat bottom.

DETAILED DESCRIPTION

This invention further relates to a device or plurality of devices which, in use, impede contamination of turfgrass drainage systems and turfgrass water systems management particularly during turf treatments comprising synthetic inputs applied on the course or surface. In the instance of a golf course this would include, without limitation, fertilizers, pesticides, herbicides and other products applied on or around the turf. The invention further relates to a protective device to cover catch basins during application of synthetic treatments and treatment inputs are prevented or impeded from entering drains and drainage systems.

In this specification the terms drain and catch basin are used interchangeably. Turning to a first preferred embodiment, a catch basin protection device is provided as illustrated in a perspective view in FIG. 1. Device 10 is illustrated showing its placement over a catch basin 30 as would be present on a turf surface such as a golf course or other turf surface. While the device as illustrated is round in shape the device could also be other shapes which, in a preferred embodiment, correspond with the shape of the catch basin to be protected substantially covering all openings into the catch basin.

Figure 1:
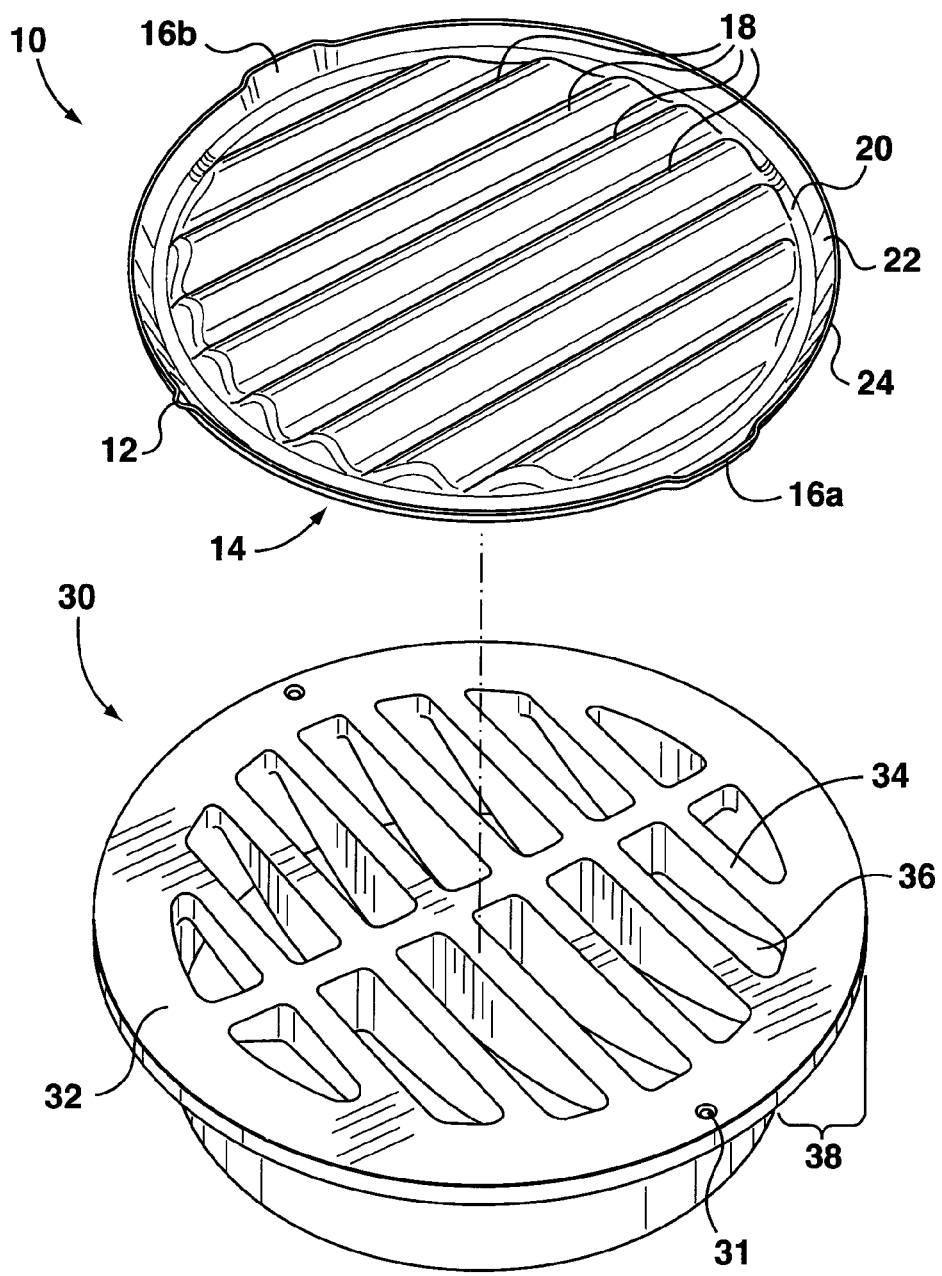

In FIG. 1 a perspective view of a preferred embodiment of the present invention is illustrated. The device 10 comprises a handle element 16, a drip spout 12, a plurality of sloped cross-pieces or cross portions 18 inclined towards the base 14 of device 10 comprising a peak inclined to a trough thereby defining a plurality of channels along an upper surface of said device. The device 10 further comprises in a preferred embodiment, an outer peripheral trough 20 extending around the perimeter of device 10. Extending along the peripheral edge of trough 20, a peripheral side edge 22 extends around the perimeter of device 10. Optionally peripheral side edge 22 may further comprise a top rim 24 along the upper surface of peripheral side edge 22.

The placement of device 10 over catch basin 30 is a generally central placement over the catch basin as indicated by the dot-dash line in FIG. 1. The shape of the device 10 and the catch basin 30 are, in a preferred embodiment, substantially the same shape. In the embodiment depicted in FIG. 1 the shapes of the device 10 and catch basin 30 are circular. However, any shape would be operable including, without limitation, squares, triangles, hexagons and other shapes which would be understood to persons of skill in the industry and art.

As further illustrated in FIG. 1, a catch basin 30 typically comprises general openings in its cover 32. It is understood that not all catch basins may have a cover. The arrangement of the catch basin drainage openings will vary between catch basins in the industry and in some instances there may be no cover at all over the catch basin opening. In the embodiment illustrated the catch basin 30 comprises drainage openings 36 as defined by a grating 34. The grating 34 of catch basin drainage 30 drainage openings 36. Optionally, cover 32 may also comprise attachment means 31 to provide means of additional anchoring, such as a screw or placement for a sod pin or other attachment. Other attachment means will be readily appreciated and understood by a person of skill in the industry and art.

Figure 2:
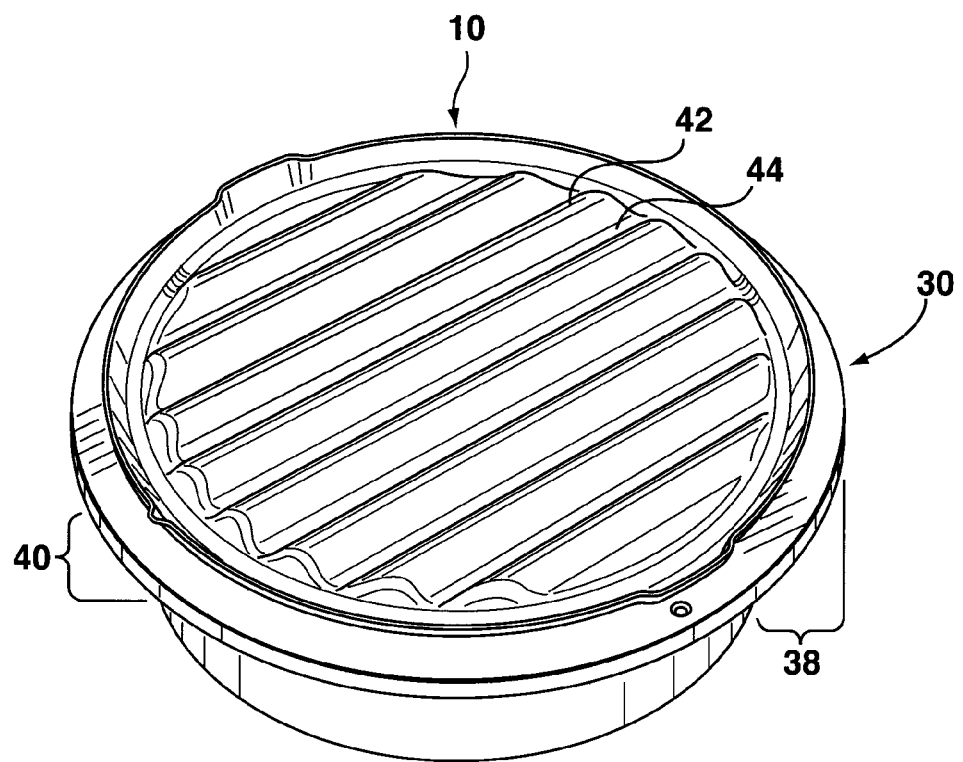

When in place, the device 10 covers the drainage openings 36 in catch basin 30. In FIG. 2 the catch basin covered by the device 10 is illustrated with the device 10 in position over top of the catch basin 30; however, the diameter of the device 10 is narrower than the cover 32 of the catch basin 30 yet wider than the openings in the grate. It is understood that if no cover was present then the diameter of the device 10 would exceed the diameter of the drain opening so the opening was substantially fully covered.

Device 10 comprises a plurality of sloped cross portions 18. Cross portions 18 define a plurality of troughs 44 and peaks 42 on the upper surface of device 10. The bottom of the device 10 may be flat or may not be flat but the upper surface will always comprise a plurality of cross portions 18 which define a plurality of troughs 44 and peaks 42. The number of cross portions, with each cross portion comprising a trough and a peak, may vary depending on the size of the device and the types of inputs which the device will collect, as would be understood by a person skilled in the art. Fewer cross portions may be preferred when applying particulate treatments, for example. Devices with different numbers of cross portions may be used in sets or alone and be designated for use during fluid turf treatments or for particulate treatments as chosen by a turf or course manager. Sets of the device are readily stackable or may be managed in containers that are designed to hold the devices of this shape. One skilled in the art would understand that varying numbers of cross portions are possible and may be preferred based on the type of treatment, the size of the catch basin, the size of the device, and costs of manufacturing.

During applications, fluids, or particulates, or other residues from synthetic treatments are captured and accumulate on the device upper surface and most importantly are impeded from falling into drainage openings 36. The drainage opening whether covered by a grate or fully opened, is placed over the opening prior to a turf treatment application and is protected by the device during the turf treatment process. It is appreciated that not all of the fluid, particulate or residue is captured on the device but when in use the device impedes the drain opening from openly receiving the fertilizer, pesticide, herbicide or other input comprised in the treatment. Some treatment inputs or residues may bounce or deflect off of the device during turf application of the treatment but this deflected portion will either land on the device itself or beneficially be deflected back on to the surrounding turf where it is desired to be present to treat the turf. The amount which enters into the drains and drainage system where it is not desired to be is thereby substantially reduced. Any turf inputs or synthetics which are deflected on to the surrounding turf during treatment application are beneficially taken up by the turf while the device captures a portion which would otherwise enter the drainage systems if the device was not present to protect the drain opening or catch basin grate cover. The device, accordingly, has benefits of protection and also deflection so that there is less waste of the treatment itself. In a preferred embodiment in FIGS. 3 and 4 when used in combination with a cover comprising a lip 38, the turf grasses 50 will about the lip 38 yet remain uncovered by device 10.

Accordingly, when in use the device will direct more of the treatment inputs to the turf than would occur in the absence of the device and impedes most of the treatment inputs from entering the drain.

The device also has manufacturing and cost benefits. The device is readily made from any of a number of materials. A preferred material is one which is light enough to transport easily yet sturdy enough to resist the wind and resist bending.

Not all catch basins have a cover with gratings and the device of the present invention could, if required, simply lie over the top of the open catch basin or open riser if necessary to cover the opening during applications. The device can function with or without a catch basin cover or existing drain cover present.

Defining a perimeter of device 10 is a peripheral side edge 22 which further comprises, in one embodiment, a rim portion 24.

The devices may be readily removed when treatment is completed on the course or playing surface. In use, a plurality of devices is used on a course which will have a plurality of drain openings. After treatment is done, the device can simply be shaken on the turf where the additional inputs are absorbed by the turf and into the ground reducing the amount entering the water systems.

In one embodiment, the device comprises at least one drip or pour spout 12 which can be used to facilitate dispensing of any accumulated inputs to reclaim the material for appropriate disposal or other use and is particularly helpful for particulate collection.

In use, one first covers any drain openings or catch basins with the devices. Equipment for applying chemical/fertilizer onto the turf can simply pass over the covered drain openings or catch basins, as they normally do without any interference caused by the device itself as the device sits flush against the drain opening and does not rise to a height above the turf that would impede application equipment. The system and device are readily incorporated into the treatment application process. Once the treatment is completed the devices are collected and reused again for other treatments on an ongoing basis.

The thickness of the rim preferentially is "thin", as one wants it to lie more or less flush with the ground once the neck has been inserted into the riser. At least so the grass around the flange portion or the gap portion between the tray and edge of catch basin is of a thickness that the grass can grow up and around the edges of the catch basin but does not extend over the tray.

As illustrated in FIG. 15, the turf 50 can grow close to the flange portion 38 of the catch basin 30 which sits in the riser of drain pipe 46. This is a preferred embodiment in turf management as the turf itself absorbs the application materials and reduces the amount of material absorbed into the ground or left on the ground surface to subsequently "runoff" into the water supply.

The handle elements 16a and 16b serve two possible functions: as handles and/or as stabilizers. In the illustrated embodiments, two handle elements opposite one another, 16a and 16b, are illustrated; however, one skilled in the art would appreciate that other handle element arrangements would be operable. In another embodiment, not illustrated, a single handle element is possible or even no handle element. A plurality of handle elements, beyond two, would also be understood by a person skilled in the art to be possible. For ease of grip, handles which are opposite one another are preferred and it is understand that a plurality of handle elements would facilitate more easily grasping the device without having to reorient oneself or reorient the device and may also reduce the likelihood of touching the surface of the device and associated residue collected thereon.

In a system comprising a plurality of the devices used on an entire course or turf playing surface, a kit could be provided with a set of devices grouped in a kit. The kit may comprise instructions for use of the devices and may define an order for applying the devices based, for example in one embodiment, upon the order of the drain openings on the course or turf surface or, in another embodiment, the kit may define or be comprised of different colored sets of devices which may, in one embodiment, define an order for the treatment applications on the course particularly identifying different types of inputs, for example. The devices may also be numbered or otherwise labeled to facilitate a specific order or usage. The shape and size of the devices facilitate ease of packaging and grouping. They are stackable and can be held in stacks for distribution or stored in stacks for storage in a small footprint.

In a preferred embodiment, the device is made from high density polyethylene (HDPE) which may be sourced from recycled material in part. Multiple sizes of varying diameters are readily manufactured. In an exemplary embodiment, the height of a cross portion from peak to trough is about 7 mm, the thickness of the base is about 3 mm, the general diameter not including the spout or handle elements is about 30.6 cm but when the two handle elements are considered the dimension across is about 32 cm. The general diameter including the pour spout is 31.1 cm. This is one exemplary set of sizes and dimensions for one device.

Handle elements 16 (16a and 16b) may conveniently also act as stabilizer portions because they create extensions at the side. The handle elements are, in a preferred embodiment, substantially flat in configuration and this facilitates substantially maintaining alignment along the plane of base 14 of the device 10. In substantial alignment with the plane of the base of the device the handles have aesthetic benefits of not sticking up above the turf thereby appearing visible above the height of the turf and they do not hinder or impede treatment machinery. In another preferred embodiment handle elements 16 are molded into the device during manufacture. In another preferred embodiment, handle elements 16 are contiguous with a peripheral side edge 22. Other embodiments for handle elements which are separately attached would be understood by a person skilled in the art. Other stabilization portions, which are not handle elements, yet also play a stabilization role would be understood by those skilled in the art.

The catch basin 30 with cover 32 could be specifically designed to receive corresponding stabilization portions, configured either as handle portions or as other stabilization means, on the device. For example, a catch basin upper surface, for example cover 32, could be modified in one embodiment to further comprise hollowed portions to receive protruding stabilization portions present on the device such that the protruding stabilization portions match and nest within the hollowed portions based on corresponding shapes without a need for further securing the device to the catch basin beyond this stabilizing means. In this preferred embodiment, not illustrated, an easy nesting fit would allow for and facilitate quick placement of the device over the catch basin and when the corresponding portions are nested together the device will be less likely to shift away thereby reducing the risk of any exposure of the catch basin or drain opening to receiving any of the treatment inputs during turf application.

In another embodiment, the device 10 could be fitted directionally over a catch basin 30 by providing a particular orientation to the cross portions 18 to match similar portions on the catch basin cover. In this embodiment a kit comprising both catch basin covers and corresponding devices that nest or otherwise fit together may be sold in combination or separately.

In the alternative, in combination or separately, a notch or protuberance or a plurality of notches or protuberances on the device 10 could match with a corresponding indentation, or a plurality of indentations on the top of a catch basin 30 or a catch basin cover 32. A reverse arrangement is understandably possible where the surface of a catch basin 30 or the catch basin/drain cover 32 comprises one or more protuberances or prominences which correspond to one or more notches or indentations on the device thereby permitting a connection that is strong enough to prevent the device from blowing away in a wind or having an edge caught in the wind yet still easily placed and removed without the need for further tools or attachment means.

In its simplest form, the device is readily removed or placed over the grate openings in the upper surface of the catch basin by matching the size of the device to the size of the opening without any requirement for the device to align or match with the drain cover or catch basin cover precisely, only cover it substantially. It is most preferred that the device cover the entire drain opening or the entire grate openings 36 on a catch basin cover 32 so treatment inputs are impeded from entering the drain when the device has been placed over the drain opening prior to turf treatment application.

Ideally, device size is selected to substantially correspond with the size of the drain opening or catch basin opening but extend just beyond the edges of the opening so the diameter of the device is selected to slightly exceed the diameter of the opening over which it is intended to be placed. However, if a stabilizing lip 38 is present then the diameter of the device 10 need not cover the lip, only the opening(s) thereby allowing the turfgrass to rise up around the edges of the device 10 as illustrated for example in FIGS. 3, 4, 15 and 16.

Typically the drain openings and catch basin covers are round and the device is of a corresponding round shape. The diameter of the device is best standardized to correspond with known standard sizes of catch basin and drain system openings such that the device has a slightly larger diameter than the opening so when placed it will cover the opening of the basin or the opening of the cover completely yet not cover much of the turf as the turf is in need of receiving the treatments. It will be understood by those skilled in the art that other shapes and sizes could be used successfully as alternative embodiments so long as the device covered most of the opening in the drain or catch basin or the corresponding cover on the drain or catch basin. In a series or plurality of openings on a course, the more openings which are better covered will lead to improved water quality.

Additional securing of the device over the catch basin or drain opening is not required but may be beneficial in windy environs or when the turf maintenance, for that part of the turf around the drain or catch basin opening, is maintained to a high standard. If treatment equipment moves close to the device then an attachment to the drain 30, the cover 32, or over the ground may be used. Other reasons for preferring to secure the device over or to the opening would be known to persons skilled in the art. Securely affixing the device to the drain opening or catch basin cover may be preferred as part of the turf management and water management goals of the golf course or other recreational turf playing surface. A secured fixing to the drain may be preferred to ensure maximize exposure of as much turf as possible or a particular cut of the turf to the treatment inputs while at the same time maximally ensuring that treatments do not enter into the drain or catch basin.

Even if in a hurry when the devices are placed over the catch basins present on the turf course or playing field, majority coverage of the gratings will be substantially achieved even by loose placement without affixing the device to the opening. If some of the opening is exposed for a small percentage of the openings the devices when used in a plurality as part of a system or a set or kit will still present advantageous benefits of reducing the overall amount of treatment inputs which enter into the drainage system and water quality will be enhanced. Golf courses and turf playing surfaces have a plurality of drain openings and accordingly benefits will be accrued as a whole even if one opening is exposed to treatments more or less than another opening. It would be understood to persons skilled in the art that speed in setting out the devices on the course and collection of the devices post treatment must be considered together with the overall intended goal of reducing the contamination of the water drainage systems.

In accordance with another embodiment, means of loosely or firmly securing the device over the openings/gratings present on the upper surface of the catch basin may be incorporated into the device. For example, in addition to, or in replacement of, the embodiments described having corresponding prominences and indentations on the matching surfaces, sod pins could also be readily used to secure the device over the catch basin.

As depicted in FIG. 16, one or more sod pins 60 may be placed to secure the device into the turf surrounding the catch basin. If only two sod pins are used, as shown in FIG. 16, it is optimal if they are positioned opposite one another but many configurations of sod pins are possible as would be understand to turf managers and persons skilled in the art. Sod pins are not required for the device to serve its function; however, one or more sod pins may be helpful to avoid shifting of the device or sliding of the device on top of the catch basin and thereby ensure the grate openings in the catch basin are maximally covered during applications and/or the devices are less likely to catch in the wind and fly away.

The likelihood of the device catching in a wind or readily shifting can also be reduced by controlling the material out of which the device is manufactured. Accordingly the device in its most preferred embodiment is light enough to be easily handled by a groundskeeper yet heavy enough that it is not prone to blowing away in a wind and it is sturdy and does not readily bend out of shape. A device of this weight would not readily shift off the top of the drain opening or catch basin cover during machine applications of treatment inputs.

In use, in a particular underground drainage line water control system, neck 40 of catch basin 30 fits into a riser of the underground drainage system. The riser, in turn, is connected to underground drainage lines. The underground drainage lines direct water to another site on the property for reuse or to an off-site location or into the surrounding watershed.

In the industry, square and rectangular shapes are known and depending on the diameter of the catch basin, various diameters are possible. All devices, regardless of shape, would function similarly as described herein.

Figure 3:
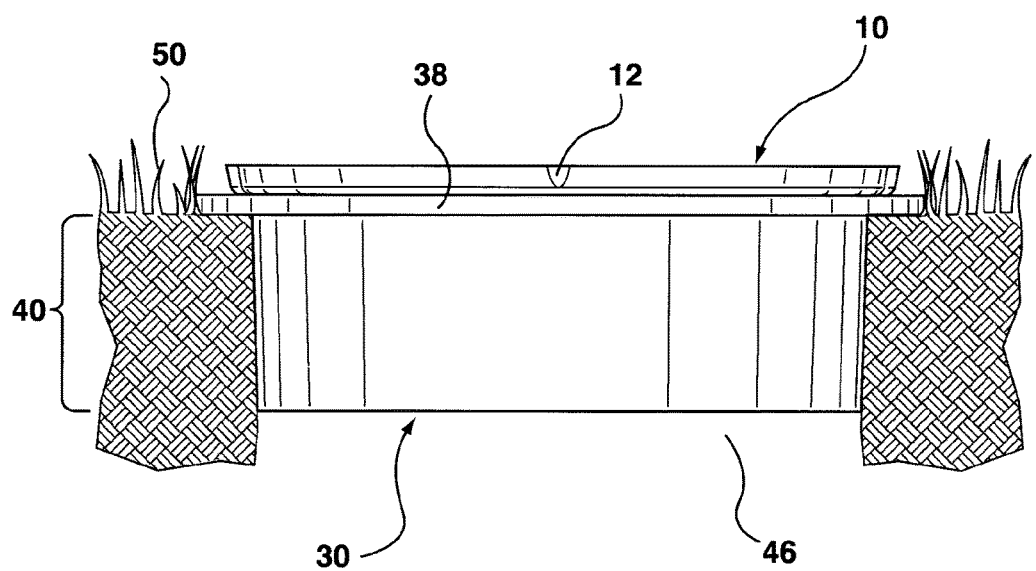
Figure 4:
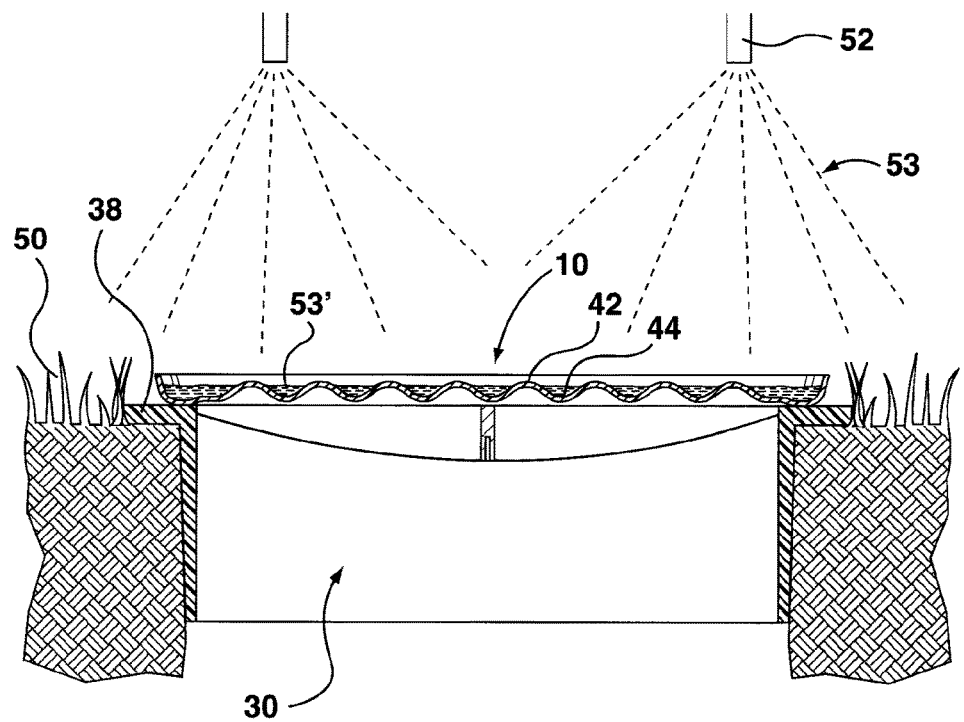

As depicted in FIG. 3, turfgrass maintenance requires applications and treatments with fertilizers and pesticides on a routine basis. FIG. 4 illustrates dispenser 52 depositing a spray of droplets 53 which not only fall on the turf but will also fall on the catch basins and drop into the drainage system of the course or field. Over time, the accumulation of chemicals 53' in troughs 44 impedes access of the same inputs into the drains which lead into a local watershed avoiding, in particular, cumulative effects. Courses are typically sprayed 7 to 10 times per year and machines are used for the spraying.

A system and method of reducing and minimizing deposition of liquid and particulate chemical applications is provided when a plurality of protective devices as taught herein are used to cover a plurality of catch basins during turf treatments on a turf course or turf playing field.

The device, methods and systems incorporating the device are easy and quick to place over the drain openings and remove after treatments. Yet they can significantly reduce the amount of treatment inputs entering the water systems and drainage systems associated with and surrounding the turf playing field, course or surface. The devices are light weight and easily placed, picked up, and moved as needed yet made of a material which is sturdy and resistant to bending and firm enough to maintain a substantially even bottom surface thereby ensuring in this preferred embodiment stable placement and coverage.

Larger diameter devices may be more susceptible to winds as there is a circumference of greater length to catch a wind and possibly flip over. One skilled in the art would understand in this instance that another embodiment comprising means to secure or connect the device to the opening, the cover of the opening or the surround turf would be best suited.

Colour coding could be used in a system of the present invention to distinguish between embodiments and/or sizes.

In accordance with another aspect of the invention the devices, in a preferred embodiment, are of a uniform shape and stack readily.

The device 10 may be manufactured out of plastics, including recycled plastics, light weight metal alloys, including for example, recycled aluminums. It typically is made from a durable light weight material and a preferred material is HDPE which has a portion derived from recycled materials. One skilled in the art would appreciate the suitable materials from which device can be made.

The device is easily lifted and placed again systematically through the course. Catch basins are covered prior to application of any synthetics on the turf and then collected after application. A plurality of devices can be moved frequently between applications, and even during applications.

Attachment means, such as sod staples or sod pins are particularly helpful when the equipment which applies the required chemical treatment, such as fertilizers and pesticides, may knock and move the device during the application. Sod staples are suggested because they are inexpensive and easy to use because of their ready flexibility to conform to the edge of the device and fit over the catch basin or its cover and into the ground nearby.

In accordance with an aspect of the present invention, to improve visibility of the device it may be coloured to contrast with the surrounding turf.

Figure 5:
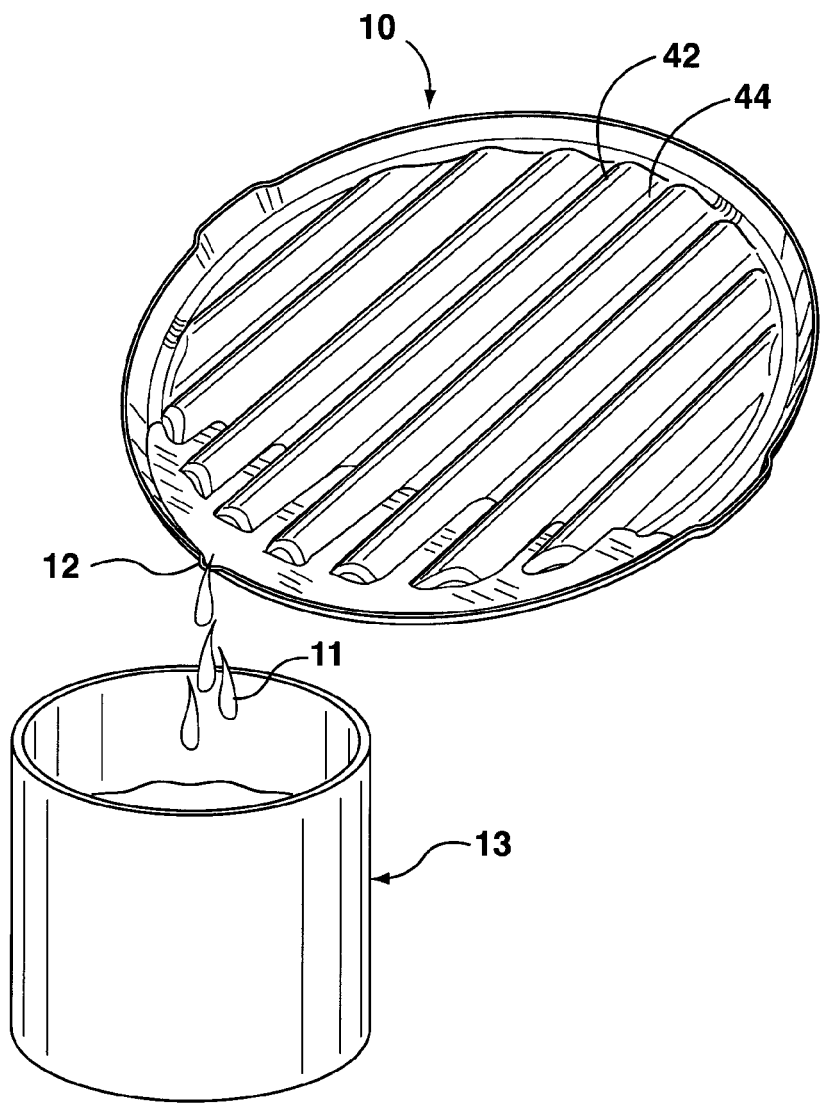
Figure 6:
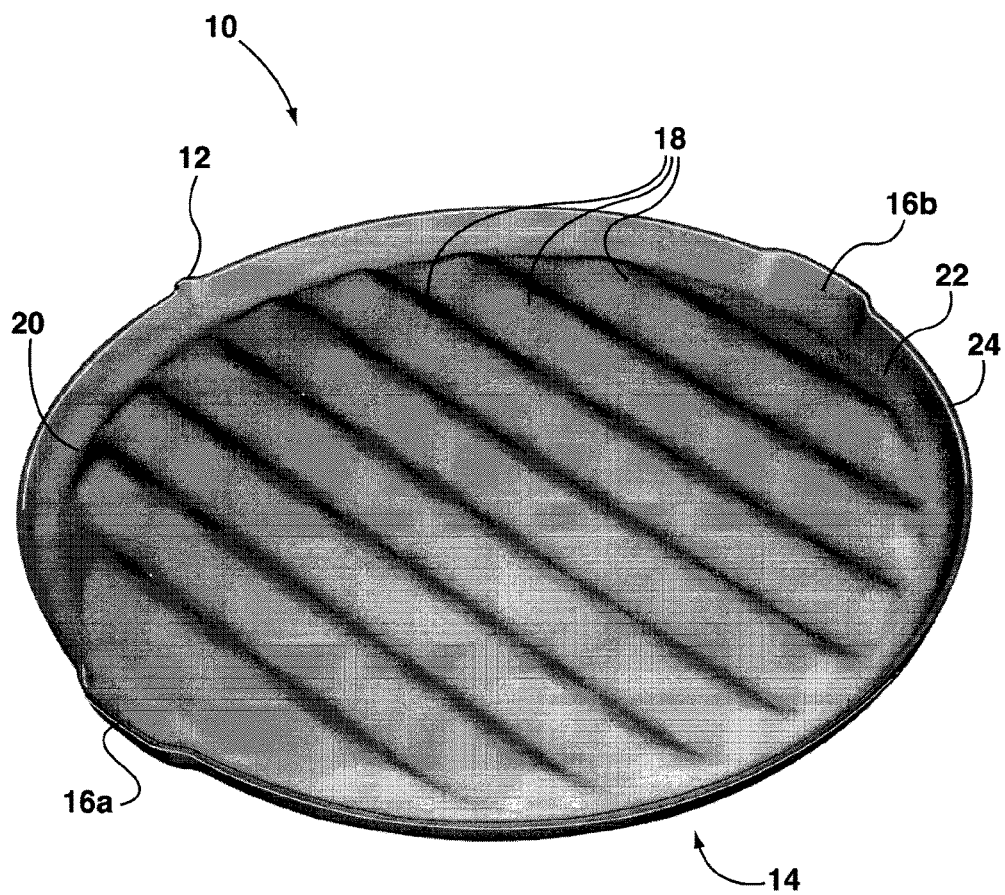
Figure 7:
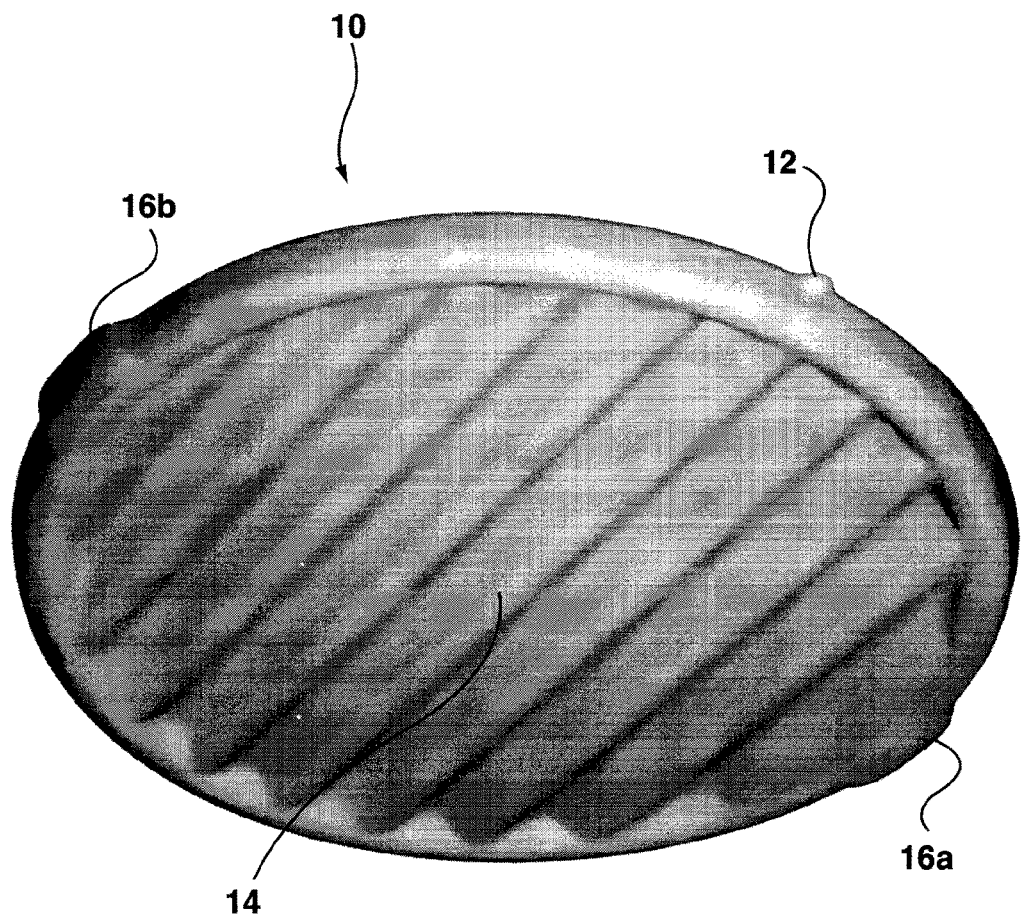
Figure 8:
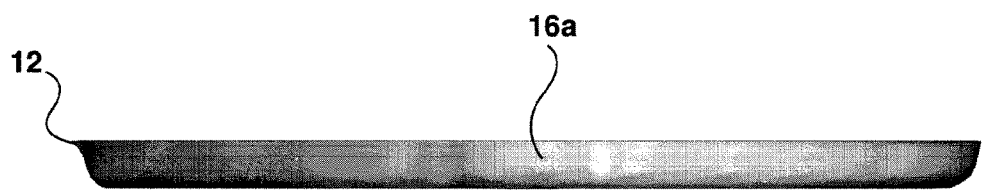
Figure 9:
Figure 10:
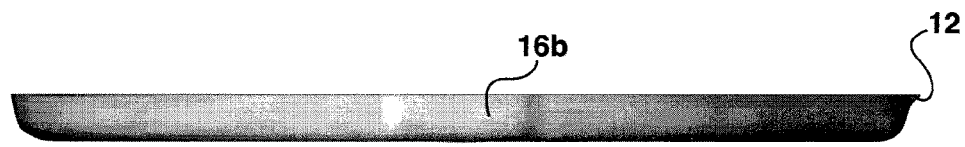
Figure 11:
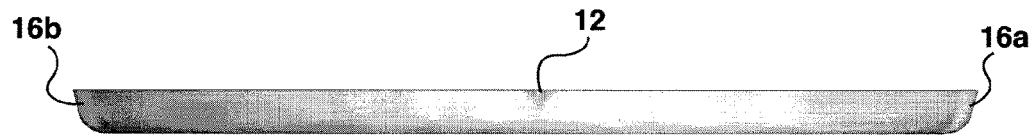

As illustrated in FIG. 5, the device 10, in accordance with one embodiment, may comprise at least one drip spout 12 to facilitate collection of any chemical residue which was trapped by the device during application. The collected residue may be dispensed into a container 13 for later appropriate disposal or other use. Although FIG. 5 depicts fluid collection as represented by droplets 11, the spout could also be used to facilitate collection of particulate all of which is collected for reuse or could be directly emptied on to the turf after collection.

FIG. 15 illustrates the application of particulate matter 54 as opposed to liquid spray. The device functions similarly for both fluids and particulates.

The device of the present invention is intended and designed for coverage of substantially flat or level catch basin upper surfaces.

Other and further embodiments of the present invention would be understood to a person skilled in the art in the context of the spirit of the invention description as a whole together with the following claims.

What is claimed is:

1. A device to temporarily and unaffixedly cover one or more drainage openings in an upper surface of a drain or a catch basin disposed on a turf surface in order to deflect or collect inputs from a turf treatment and thereby impede such inputs from entering a drainage system connected to the drain or the catch basin, the device comprising:
   a) a base portion comprising a central portion and a peripheral portion, the peripheral portion comprising an outer peripheral trough, and the central portion comprising a plurality of parallel sloped cross portions, comprising troughs and peaks and a plurality of troughs between the plurality of peaks that define channels into the peripheral trough, and
   b) a peripheral wall including a peripheral top edge, the peripheral wall extending from an outer peripheral edge of the outer peripheral trough, and tapering upwardly and outwardly to the peripheral top edge.

2. The device according to claim 1 where the plurality of parallel troughs and peaks are symmetrically aligned across substantially all of the central portion.

3. The device according to claim 2 wherein the plurality of parallel troughs and peaks are substantially evenly spaced apart across the central portion.

4. The device according to claim 3 wherein the device further comprises at least one handle element.

5. The device according to claim 4 wherein the handle element is integrally molded into the peripheral wall.

6. The device according to claim 1 wherein the peripheral wall includes a pour spout for pouring out collected inputs from the turf treatment from the peripheral trough.

7. The device according to claim 1 wherein the device is substantially round.

8. The device according to claim 1 further comprising an attachment means for temporarily attaching the device to the upper surface of the drain or catch basin.

9. The device according to claim 8 wherein the attachment means are sod pins to secure said device, wherein the sod pins are secured in the ground around a perimeter of the device.

10. The device according to claim 8 wherein said attachment means comprise a protuberance for reception in a hollow portion of the upper surface of the catch basin.

11. A method to collect, impede or prevent inputs from a turf treatment application on a turf surface from entering into the drainage openings in the upper surface of the drain or catch basin on said turf surface comprising the steps of:
   a) providing the device of claim 1;
   b) placing the device temporarily and unaffixedly over the drainage openings in the upper surface of the drain or catch basin prior to the turf treatment application to the turf surface.

12. The method of claim 11 further comprising the step of temporarily securing the device to the turf surface.

13. The method according to claim 12 wherein the turf surface is a golf course and the step of temporarily securing the device comprises placement of at least one sod pin on the peripheral edge of the device and securing the at least one sod pin into the turf surface surrounding the device.

14. A kit comprising a plurality of devices, each device in accordance with claim 1, the kit further comprising instructions for placement of the plurality of the devices on a turf surface before treatment of the turf surface with inputs for the turf surface.

15. The kit according to claim 14 wherein the kit further comprises a container configured to hold the plurality of devices in a stacked formation.

16. The device of claim 1 wherein a base of the peripheral trough is disposed planarly below a base of each of the parallel of the troughs.

17. The device of claim 1 made of a high density polyethylene (HDPE) such that the device is sufficiently sturdy to resist wind conditions and to resist bending.

18. A method for temporarily covering a pattern of drainage openings in a cover of a catch basin in a turf surface to collect inputs from a turf treatment and impede or prevent such inputs from entering through the drain openings into a drainage system, comprising:
   a) providing a covering device having a footprint larger than a footprint of the pattern of drainage openings, the covering device comprising a floor and a peripheral wall, the peripheral wall tapering inwardly and downwardly from a top edge to the floor;
   b) manually placing the covering device temporarily and unaffixedly onto the cover of the catch basin so as to cover the pattern of drainage openings;
   c) applying the inputs on the turf surface surrounding the catch basin, wherein the inputs dispersed over the drainage openings accumulate on the upper surface of the covering device, and
   d) manually removing the covering device from the cover of the catch basin after application of the inputs is completed and emptying the cover of accumulated inputs away from the catch basin, thereby preventing accumulation of inputs entering into the catch basin.

19. The method of claim 18 wherein the provided covering device has an upper surface having a central portion comprising a plurality of parallel cross portions defining cross portion troughs and cross portion peaks, and a peripheral trough.

20. The method according to claim 19 wherein the turf surface is selected from the group consisting of golf courses, sports fields, parks, and turf surface landscapes.

* * * * *

UNITED STATES PATENT AND TRADEMARK OFFICE
CERTIFICATE OF CORRECTION

PATENT NO.         : 10,208,884 B2                                  Page 1 of 1
APPLICATION NO.    : 15/115442
DATED              : February 19, 2019
INVENTOR(S)        : Jason Stephen Honeyball It is certified that error appears in the above-identified patent and that said Letters Patent is hereby corrected as shown below:

In the Claims

Column 13 Claim 1, Line 13, delete "sloped cross portions, comprising troughs and".

Signed and Sealed this
Twenty-sixth Day of March, 2019

Andrei Iancu
*Director of the United States Patent and Trademark Office*